United States Patent
Laidlaw et al.

(10) Patent No.: US 7,355,597 B2
(45) Date of Patent: *Apr. 8, 2008

(54) METHOD, APPARATUS AND COMPUTER PROGRAM PRODUCT FOR THE INTERACTIVE RENDERING OF MULTIVALUED VOLUME DATA WITH LAYERED COMPLEMENTARY VALUES

(75) Inventors: David H Laidlaw, Barrington, RI (US); Andreas Wenger, Los Angeles, CA (US)

(73) Assignee: Brown University Research Foundation, Providence, RI (US)

( * ) Notice: Subject to any disclaimer, the term of this patent is extended or adjusted under 35 U.S.C. 154(b) by 821 days.

This patent is subject to a terminal disclaimer.

(21) Appl. No.: 10/431,130

(22) Filed: May 6, 2003

(65) Prior Publication Data

US 2003/0234781 A1    Dec. 25, 2003

Related U.S. Application Data

(60) Provisional application No. 60/380,088, filed on May 6, 2002.

(51) Int. Cl.
  *G06T 15/00*    (2006.01)
(52) U.S. Cl. ................ 345/419; 345/424; 382/154
(58) Field of Classification Search .......... None
  See application file for complete search history.

(56) References Cited

U.S. PATENT DOCUMENTS

| | | | |
|---|---|---|---|
| 5,488,297 A | 1/1996 | Nakada | 324/309 |
| 5,539,310 A | 7/1996 | Basser et al. | 324/307 |

(Continued)

FOREIGN PATENT DOCUMENTS

WO    WO-01/91639 A1    12/2001

OTHER PUBLICATIONS

Gallagher, Richard S., Computer Visualization, 1995, CRC Press, pp. 137-142, 151-156.*

(Continued)

*Primary Examiner*—Kee M Tung
*Assistant Examiner*—Andrew Yang
(74) *Attorney, Agent, or Firm*—Harrington & Smith, PC

(57) ABSTRACT

Described is a system, method and computer program product for rendering volumetric multivalued primary data. The system includes a rendering engine having an input coupled to a source of multivalued primary data and an output coupled to a display. The rendering engine includes a data processor for calculating additional data values from the primary data, deriving at least one visual representation from the primary data and the additional data values, and mapping the derived visual representation through transfer functions to hardware primitives for volumetrically rendering the derived visual representation to provide a visualization. The system further includes a user interface for interacting with the visualization. The source of primary data can be a magnetic resonance imaging system, and the primary data may be a multivalued combination obtained from T1 weighted data, T2 weighted data, diffusion data, velocity data, magnetization transfer data, perfusion data, data derived from other imaging modalities (e.g., PET), and simulation data. The primary data can be diffusion tensor data generated by the MRI system from tissue, and the data processor operates to identify directed diffusion paths and to render the directed diffusion paths as thread-like structures. Indications of at least flowing blood velocity and vorticity can also be rendered from MRI data or from simulations.

54 Claims, 13 Drawing Sheets

U.S. PATENT DOCUMENTS

| | | | | |
|---|---|---|---|---|
| 5,560,360 | A | 10/1996 | Filler et al. | 128/653.2 |
| 5,969,524 | A | 10/1999 | Pierpaoli et al. | 324/307 |
| 6,441,821 | B1 | 8/2002 | Nagasawa | 345/426 |
| 6,463,315 | B1 | 10/2002 | Klingberg et al. | 600/410 |
| 6,526,305 | B1 | 2/2003 | Mori | 600/410 |
| 6,529,763 | B1 | 3/2003 | Cohen et al. | 600/410 |
| 6,573,893 | B1* | 6/2003 | Naqvi et al. | 345/424 |
| 6,580,936 | B2* | 6/2003 | Muraki et al. | 600/410 |
| 6,642,716 | B1 | 11/2003 | Hoogenraad et al. | 324/309 |
| 6,771,262 | B2* | 8/2004 | Krishnan | 345/424 |
| 6,845,342 | B1* | 1/2005 | Basser et al. | 702/183 |
| 6,995,763 | B2* | 2/2006 | Gatti et al. | 345/424 |
| 7,015,935 | B2* | 3/2006 | Herget et al. | 345/649 |
| 2002/0005850 | A1* | 1/2002 | Osborne et al. | 345/424 |
| 2002/0042569 | A1* | 4/2002 | Wedeen | 600/411 |

OTHER PUBLICATIONS

"Visualizing Diffusion Tensor Images of the Mouse Spinal Cord", David H. Laidlaw et al., In Proceedings IEEE Visualization '98, iEEE. 127-134.

"Hue-Balls and Lit-Tensors for Direct volume Rendering of Diffusion Tensor Fields", Gordon Kindlmann et al., In Proceedings IEEE Visualization '99, IEEE, 183-189.

"In Vivo Fiber Tractography Using DT-MRI Dta", Peter J. Basser et al., Magnetic Resonance in Medicine 44, 626-632.

"Streamtubes and Streamsurfaces for Visualizing Diffusion Tensor MRI Volume Images", Song Zhang et al., IEEE Visualization 2000, 2 pps.

"Strategies for Effectively Visualizing 3D Flow with Volume LIC", Victoria Interrante et al., In Proceedings of the conference on Visualization '97, pp. 421-424.

"Interactive Visualization Of 3D-Vector Fields Using Illuminated Stream Lines", Malte Zockler et al., IEEE, Visualization '96, IEEE, ISBN 0-89791-864-9, pp. 107-113.

"Interactive Volume Rendering Using Multi-Dimensional Transfer Functions and Direct Manipulation Widgets", Joe Kniss et al., IEEE Visualization 2001, pp. 255-262.

"Toward a quantitative assessment of diffusion anisotrophy", C. Pierpaoli et al., Magnetic Resonance Magazine, Dec. 1996, pp. 893-906.

"Accelerated Volume Rendering and Tomographic Reconstruction Using Texture Mapping Hardware", Brian Cabral et al., ACM Symposium on Volume Visualization, 1994, ISBN:0-89791-741-3, pp. 91-98.

"Direct Volume Rendering with Shading via Three-Dimensional Textures", Allen Van Gelder et al., 1996 Volume Visualization Symposium, IEEE 23-30, ISBN 0-89791-741-3, 8 pages.

"Hardware-Accelerated Parallel Non-Photorealistic Volume Rendering", Eric B. Lum et al., ACM 2002, 9 pages.

"Real-Time Fur over Arbitrary Surfaces", Jerome Lengyel et el., Eurographics rendering Workshop 2000, Acm, pp. 243-256.

"Geometric Diffusion Measures for MRI from Tensor Basis Analysis", C.F. Westin et al., Proceedings of ISMRM 1997, 9 pages.

"Interactive Rendering of Multivalued Volume Data using Layered Complementary Volumes", Andreas Wenger et al.., IEEE TVCG, Apr. 2003, pp. 100-111.

"Imaging Cortical Association Tracts in the Human brain Using Diffusion-Tensor-Based Axonal Tracking", Mori, Susumu et al., Magnetic Resonance in Medicine 47:215-223 (2002).

"Visualizing Second-Order Sensor fields with Hyperstreamlines", Demarcelle, Thierry, et al., IEEE Computer Graphics & Applications, V. 13 N. 4, pp. 25-33 (1993).

"Methods of Mathematical Physics", Courant, R., et al., Interscience Publishers New York, vol. 1, 1937, pp. 458-459.

"An Immersive Virtual Environment for DT-MRI Volume Visualization Applications: a Case Study", Zhang, S., et al., IEEE Visualization, Oct. 2001, 5 pages.

"Toward Application of Virtual Reality to Visualization of DT-MRI Volumes", Zhang, S., MICCAI 2001, 3 pages.

"Visualizing Diffusion Tensor Volume Differences", da Silva, M.J., et al., IEEE Visualization, Oct. 2001, 2 pages.

"Visualizing Diffusion Tensor MR Images Using Streamtubes and Streamsurfaces", Zhan, Song, et al., Human Brain Project, May 2000, pp. 1-15.

"Rendering Fur With three Dinensional Textures", James T. Kajiya et al., Proceedings SIGGRAPH '89, ACM, pp. 271-280.

"In Vivo Fiber Tractography Using DT-MRI Dta", Peter J. Basser et al., Magnetic Resonance in Medicine 44, 626-632, 2000.

* cited by examiner

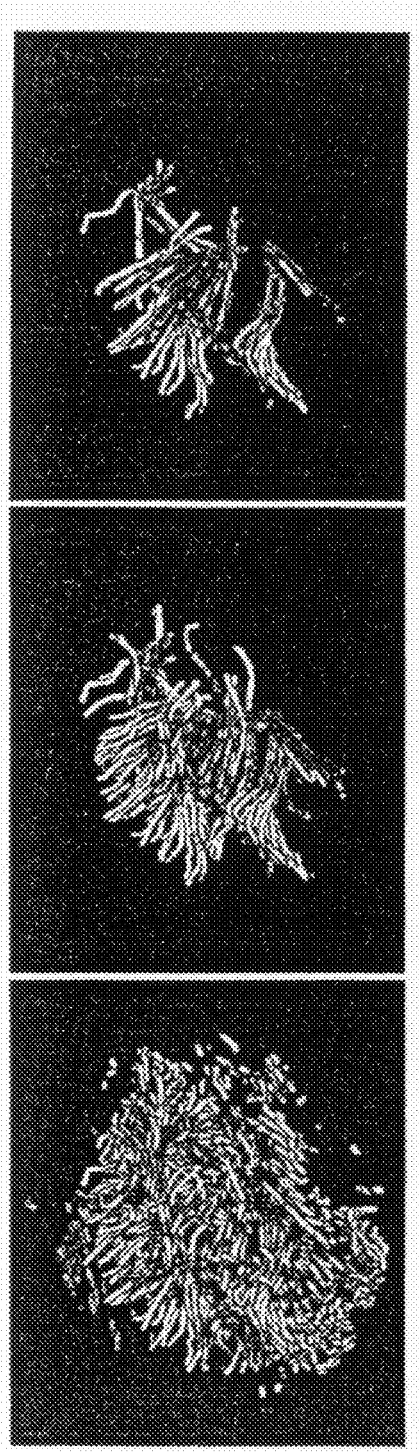

| T2-WEIGHTED MRI | CHANNELS |
|---|---|
| GRADIENT (x,y,z) | R, G, B |
| GRADIENT MAGNITUDE<br>2nd DIRECTIONAL DERIVATIVE<br>T2 VALUE | R<br>G<br>A |
| DIRECT-VOLUME-RENDERED DTI | |
| GRADIENT (x,y,z) | R, G, B |
| GRADIENT MAGNITUDE<br>$c_l$<br>$c_p$<br>DIFFUSION MAGNITUDE | R<br>G<br>B<br>A |
| STREAMTUBES | |
| TANGENT (x,y,z)<br>DENSITY | R, G, B<br>A |
| AVERAGE DIFFUSION<br>$c_l$<br>$c_p$<br>LENGTH | R<br>G<br>B<br>A |
| DIRECT-VOLUME-RENDERED FLUID FLOW | |
| HALOS | |
| DENSITY | A |

FIG.14

$$I = k_d I_t (\sqrt{1-(T \cdot L)^2})^p + k_s (\sqrt{1-(T \cdot H)^2})^n \quad (1)$$

$$I = k_a I_t + k_d I_t (N \cdot L) + k_s (N \cdot H)^n \quad (2)$$

$$\begin{cases} c_\ell = \dfrac{\lambda_1 - \lambda_2}{\lambda_1 + \lambda_2 + \lambda_3} \\[2ex] c_p = \dfrac{2(\lambda_2 - \lambda_3)}{\lambda_1 + \lambda_2 + \lambda_3} \\[2ex] c_s = \dfrac{3\lambda_3}{\lambda_1 + \lambda_2 + \lambda_3} \end{cases} \quad (3)$$

FIG. 15

METHOD, APPARATUS AND COMPUTER PROGRAM PRODUCT FOR THE INTERACTIVE RENDERING OF MULTIVALUED VOLUME DATA WITH LAYERED COMPLEMENTARY VALUES

CLAIM OF PRIORITY FROM A COPENDING U.S. PROVISIONAL PATENT APPLICATION

This patent application claims priority under 35 U.S.C. 119(e) from Provisional Patent Application No.: 60/380,088, filed May 6, 2002, the content of which is incorporated by reference herein in its entirety.

STATEMENT OF GOVERNMENT RIGHTS

This invention was made with government support under grant number P-20-DA089044 awarded by the National Institutes of Health (NIH), and under grant number CCR-0086065 awarded by the National Science Foundation (NSF). The government has certain rights in this invention.

TECHNICAL FIELD

This invention relates generally to the rendering of images for display and, more specifically, relates to volume rendering methods and apparatus for displaying images of three dimensional objects such as, but not limited to, images of the human brain derived from data generated by a magnetic resonance imaging (MRI) system, as well as from simulated flow calculations.

BACKGROUND

Magnetic resonance imaging (MRI) is well established as a technique for elucidating structure, and is used, for example, to discriminate between normal and pathological tissue. The MRI image contrast depends on differences in parameters such as the proton density, the longitudinal relaxation time T1, and the transverse relaxation time T2 for different media. MRI has further been extended to imaging in which parameters such as the magnitude and phase of the transverse magnetization, the magnitude of the longitudinal magnetization, and the resonance frequency (related to spectroscopy) are related to functions such as molecular displacements (e.g., flow and diffusion). Further, MR has been extended to measure tensor-valued diffusion rates.

Diffusion along a given axis is typically measured by placing a pair of diffusion sensitizing gradient pulses in the same axis in the magnetic resonance (MR) pulse sequence. The gradient pulses impose position-dependent phases on water protons that are equal in magnitude but opposite in sign, and therefore cancel for stationary spins. However, for protons that move between the two gradient pulses, a finite net phase is accumulated. The sum of all phases from all protons results in attenuation of the MR signal due to interference effects. The magnitude of signal attenuation is dependent on the diffusivity of water, and the width, separation and amplitude-of the gradient pulses. In a generalized case, where the diffusivity may differ in different directions, a diffusion tensor matrix notation is used.

The above-noted MRI techniques generate large multivalued datasets representing a three dimensional (3D) structure, such as human tissue. In order to be of use, the datasets need to be converted to a form that can be displayed to a user, such as a physician or other health care professional. The process of converting the datasets to a displayable form can be referred to as volume rendering, as compared to surface rendering techniques that operate, typically, with tessellated surface representations of three dimensional objects.

In addition to datasets derived from MRI, multivalued datasets can be generated by modeling and simulations, and with other imaging modalities such as PET, OPT, CT, EEG and MEG.

Representative U.S. Patents that pertain at least in part to the generation of images derived from MRI-generated datasets include the following: U.S. Pat. No. 5,539,310, "Method and System for Measuring the Diffusion Tensor and for Diffusion Tensor Imaging", by Basser et al.; U.S. Pat. No. 5,969,524, "Method to Significantly Reduce Bias and Variance of Diffusion Anisotrophy Measurements", by Pierpaoli et al.; U.S. Pat. No. 6,441,821, "Method and Apparatus for Displaying Three-Dimensional Image by Use of Tensor Rendering", by Nagasawa; U.S. Pat. No. 6,463,315, "Analysis of Cerebral White Matter for Prognosis and Diagnosis of Neurological Disorders", by Klingberg et al.; U.S. Pat. No. 6,526,305, "Method of Fiber Reconstruction Employing Data Acquired by Magnetic Resonance Imaging", by Mori; and U.S. Pat. No. 6,529,763, "Imaging of Neuronal Material", by Cohen et al.

By example, U.S. Pat. No.: 6,526,305 (Mori) describes a method of creating an image of brain fibers that includes exposing the brain fibers to a MRI process. The data acquired from the MRI includes the acquisition of diffusion-weighted images that are later employed to calculate an apparent diffusion constant at each pixel along more than six axes. The data is introduced into a microprocessor that calculates six variables in a diffusion tensor and obtains a plurality of eigenvalues and eigenvectors. This is accomplished by employing a diffusion sensor that is diagonalized to obtain three eigenvalues and three eigenvectors, with the six values being subjected to further processing to generate imaging information representing the properties of the fibers. The process includes the initiation of fiber tracking by selecting a pixel for initiation of tracking, connecting pixels and effecting a judgement regarding termination of the pixel tracking in each direction based upon the randomness of the fiber orientation of the adjacent pixels.

Other publications related to the problem of imaging multivalued data sets, in particular diffusion tensor field visualization, vector field visualization, hardware-accelerated volume rendering, and thread rendering are now discussed.

Diffusion Tensor Field Visualization

There are several approaches to visualizing diffusion tensor imaging (DTI) datasets. Since a diffusion tensor is a symmetric matrix with positive eigenvalues, an ellipsoid is a natural geometric representation for it. Pierpaoli, C., and Basser, P. 1996, "Toward a Quantitative Assessment of Diffusion Anisotropy", Magnetic Resonance Magazine, 893-906, used a two dimensional (2D) array of ellipsoids to visualize a 2D diffusion tensor field. To give a more continuous visual appearance, Laidlaw, et al. normalized the ellipsoids, "Visualizing Diffusion Tensor Images of the Mouse Spinal Cord", In Proceedings IEEE Visualization '98, IEEE, 127-134. Additionally, Laidlaw et al. employed concepts from oil painting, i.e., mapping data components onto brush strokes and building up the strokes in multiple layers, to represent more of the data, creating a second type of 2D visualization showing all of the multiple values simultaneously.

However, these 2D-based techniques do not generalize well to three dimensional (3D) representations. Placing the ellipsoids in 3D to visualize a 3D dataset has at least two drawbacks. First, placing an ellipsoid at every data point in three dimensional space obscures all layers of ellipsoids except the outermost layer. Second, continuity cannot be shown in an ellipsoid representation, and without continuity information, neural connectivity is difficult to visualize and understand.

Kindlmann et al., "Hue-Balls and Lit-Tensors for Direct Volume Rendering of Diffusion Tensor Fields", In Proceedings IEEE Visualization '99, IEEE, 183-189, overcame the problem of obscuring data points in 3D with a direct volume rendering approach: to every data point they assign a certain opacity and color based on the underlying diffusion tensor dataset, using the concept of a "barycentric map" for the opacity and "hue-balls" and "lit-tensors" for coloring and lighting. However, the use of this approach does not solve the problem of accurately and unambiguously locating anatomically distinct regions of the brain, and understanding the underlying connectivity.

Basser et al., "In Vivo Fiber Tractography Using DT-MRI Data", Magnetic Resonance in Medicine 44, 625-632, calculated the trajectories of neural fibers in brain white matter that were generated from the diffusion tensor field by integrating along the eigenvector with the largest eigenvalue. Zhang et al., "Streamtubes and Streamsurfaces for Visualizing Diffusion Tensor MRI Volume Images", in IEEE Visualization 2000, used this method to generate streamtubes to visualize continuous directional information in the brain (the streamtubes are calculated during a preprocessing step). The use of streamtubes aids in solving the problem of representing continuity, but at the cost of the loss of structural information in those areas without stream tubes.

Of the extensive amount of effort that has been directed to creating effective vector field visualizations, the following two publications are believed to be of the most interest to this invention. Interrante, V., and Grosch, C., "Strategies for Effectively Visualizing 3D Flow with Volume LIC", In Proceedings of the conference on Visualization '97, 421, visualized 3D flow with volume line integral convolution (LIC). Adapting artistic techniques, they introduced 3D visibility-impeding halos to improve the perception of depth discontinuities in a static volume renderer. As they demonstrated with off-line rendering, halos improve depth perception and help make complex 3D structures easier to analyze for the viewer. In addition, Zöckler et al., "Interactive visualization of 3D-Vector fields using illuminated streamlines", in IEEE Visualization '96, IEEE, ISBN 0-89791-864-9, introduced illuminated field lines to visualize 3D vector fields.

Hardware-Accelerated Volume Rendering 3D volumes are often stored in a texture memory in hardware-accelerated volume rendering systems. Data are then mapped onto slices through the volume and blended together to render an image. Cabral et al., "Accelerated Volume Rendering and Tomographic Reconstruction Using Texture Mapping Hardware", in ACM Symposium On Volume Visualization, ACM, introduced a 2D texture approach for such rendering, where three stacks of 2D slices are generated through the volume, one perpendicular to each coordinate axis. As the viewpoint changes, the renderer chooses the "best" stack to render. This approach exploits hardware-based bilinear interpolation in the plane of the slice. A drawback of this approach, however, is that three copies of the volume must be stored in the texture memory.

Van Gelder, A. and Kim, K., "Direct volume rendering with shading via three-dimensional textures", in 1996 Volume Visualization Symposium, IEEE, 23-30, ISBN 0-89791-741-3, avoided the redundant data copies by rendering with 3D textures. Generally view-aligned slices are used, exploiting a trilinear interpolation capability in the hardware.

Several volume-rendering implementations employ commercial graphics cards or distributed hardware. However, these approaches do not target the visualization of multivalued datasets.

Kniss et al., "Interactive Volume Rendering Using Multi-Dimensional Transfer Functions and Direct Manipulation Widgets", In IEEE Visualization 2001, IEEE, used interactive transfer functions operating on directional derivative values to select boundaries in scalar-valued datasets. Engel et al., "High-Quality Pre-Integrated Volume Rendering Using Hardware-Accelerated Pixel Shading", in Siggraph/Eurographics Workshop on Graphics Hardware 2001, ACM, described an approach that rendered more quickly, with fewer slices, by using additional precalculated volumes.

Lum, E. B., and Ma, K. L., "Hardware-Accelerated Parallel Non-Photorealistic Volume Rendering", In Proceedings of the Non-Photorealistic Animation and Rendering conference 2002, implemented a hardware-accelerated parallel non-photorealistic volume renderer that uses multi-pass rendering on consumer-level graphics cards. Their system emphasizes edges or depth ordering using artistically motivated techniques.

Hair, Fur, and Thread (Filament) Rendering

Kajiya, J. T., and Kay, T. L., "Rendering fur with Three Dimensional Textures", in Proceedings SIGGRAPH '89, ACM, pp. 271-280, introduced the concept of texels to render realistic-looking fur. Texels are 3D texture maps in which both a surface frame (normal and tangent) and the parameters of a lighting model are distributed throughout a volume, thereby representing a complex collection of surfaces with a volumetric abstraction. Kajiya and Kay also developed a Phong-like lighting model for fur.

Lengyel, J. E., "Real-Time Fur", in Eurographics Rendering Workshop 2000, ACM, 243-256, used a volumetric texture approach to render short threads in real time that is based on a stack of partially transparent 2D texture layers. In a preprocessing step, procedurally defined threads are filtered into layers and blended together. In Lengyel's approach, lighting calculations are performed at run time using Banks' hair-lighting model.

As can be appreciated, the creation of comprehensive and accurate visualizations for exploring 3D multivalued data presents a number of challenges. A first challenge is to create visualizations in which the data nearer to the viewer does not excessively obscure that farther away. A second challenge is to represent many values and their interrelationships at each spatial location. As an example, neuroimaging data and flow data may each have many primary values at each point. The multiple values exacerbate the obscuration problem, not only because more values must be shown at each spatial location, but also because important relationships among the different data values require the use of more of finite visual bandwidth. A third challenge is to convey relationships among different spatial locations. A further challenge is to render the large datasets interactively.

A need thus exists to address and overcome these and other challenges related to the volumetric imaging of multivalued, large datasets. Prior to this invention, however, this need was not adequately met.

SUMMARY OF THE PREFERRED EMBODIMENTS

The foregoing and other problems are overcome, and other advantages are realized, in accordance with the presently preferred embodiments of these teachings.

This invention provides a method and apparatus for rendering multivalued volumes in an interactive and flexible manner. The method operates to transform at least one multivalued dataset into an interactive visualization. Aspects of this invention include the interactive rendering of multivalued volumes, the use of a filament-like or thread-like density volume to represent continuous directional information, the use of a complementary volume to generate a halo around each thread in order to make the thread visually distinct, the use of a derived exploratory culling volume to interactively control the complexity of a layer, and the use of two-dimensional transfer function editing. In the preferred embodiment the interactive volumetric rendering system can be implemented using commodity personal computer (PC) graphics hardware, and thus does not require the use of high cost and complexity graphical display systems.

Neuroimaging data may have many (e.g., seven) primary values at each point, as well as several useful additional derived values. Similarly, flow data may have four primary values at each point, as well as some number, such as three to six, of additional useful derived values. The volumetric rendering approach of this invention is shown to be well-suited for processing such complex multivalued datasets for display to a user.

The invention is presented in the exemplary context of a plurality of visualizations of second order tensor-valued magnetic resonance imaging (MRI) data, and with simulated three dimensional (3D) fluid flow data. It is shown that a user can effectively explore these complicated multivalued volumes since the renderer provides interactive control over the relationships among the values. This invention is not limited for use, however, only with MRI-generated data, or with fluid flow data.

The teachings of this invention are applicable to both monoscopic and stereoscopic image presentations.

In a first step the method derives new values from a primary dataset. In a second step the method abstracts both the primary and derived values into visual representations. In a third step the method maps the data through transfer functions that produce color and opacity. In a further step the method renders the layers interactively as a user manipulates the transfer functions.

This invention thus provides a multilayer interactive volume-rendering system and method that can be used for exploring multivalued 3D scientific data. Exemplary and non-limiting applications of this invention include the exploration of brain anatomy and pathology, and the exploration of blood flow in arteries.

A presently preferred direct-volume-rendering technique makes the connectivity more apparent than the prior art approaches, such as that by Kindlmann et al., by using a coloring and lighting approach that is based on the diffusion magnitude and the diffusion anisotropy. In addition, this invention expands the use of the barycentric opacity map to generate color, in addition to opacity.

This invention also extends the above-mentioned algorithm of Zhang et al. to continue stream tubes through areas with planar anisotropy. Additionally, this invention filters the stream tube paths into a thread density volume, rather than representing them as polygonal models.

This invention also extends the above-mentioned algorithm of Interrante et al. by achieving the halo effect in real time by using a texture-based volume renderer that makes complex 3D structures more readily apparent in 2D visualizations.

This invention also extends the above-mentioned technique of Zöckler et al. by providing a volumetric rendering approach that renders at a rate independent of tube or line complexity, and that combines with other volumetric layers to create visualizations that convey more information.

The presently preferred implementation uses, by example, 3D textures with view-aligned slices, and employs hardware texture compression to further reduce texture memory consumption.

This invention uses interactive transfer functions to visualize scalar-valued datasets, although with less computationally expensive interactive manipulation widgets than those employed in the prior art (e.g., see Kniss et al.). This invention processes multivalued datasets by deriving a scalar value from the original dataset, and then calculating the directional derivative from the derived value. In addition, and different from the approach of Engel et al., this invention specifically targets multivalued datasets, and does so without the use of precalculated volumes to reduce slice count.

Further, the presently preferred embodiment of this invention implements a multi-pass volume renderer that utilizes multiple rendering passes to enhance visual cues, but unlike the system described by Lum and Ma, the rendering is targeted to exploratory visualization of multivalued data, which has significant implications for the interface, implementation, and results.

With regard to the rendering of filament-like or thread-like structures, which are important when performing volumetric rendering of the brain and certain other tissues, this invention takes the approach that the thread density volume defines free-floating threads. Instead of providing parameters for lighting, it is preferred to store derived values from the multivalued datasets, along with tangent and density values throughout the volume. In addition, and in contrast to the above-mentioned approach of Lengyel, in this invention the data-defined threads remain individually distinguishable, and the lighting model is selected to be one appropriate for volume rendering.

Described is a system, method and computer program product for rendering volumetric multivalued primary data. The system includes a rendering engine having an input coupled to a source of multivalued primary data and an output coupled to a display. The rendering engine includes a data processor for calculating additional data values from the primary data, deriving at least one visual representation from the primary data and the additional data values, and for mapping the derived visual representation through transfer functions to hardware primitives for volumetrically rendering the derived visual representation to provide a visualization. The system further includes a user interface for interacting with the visualization. The source of primary data can be a magnetic resonance imaging system, and the primary data may be a multivalued combination obtained from T1 weighted data, T2 weighted data, diffusion data, velocity data, magnetization transfer data, perfusion data, other volume imaging data, and simulation data. The primary data can be diffusion tensor data generated by the MRI system from tissue, and the data processor operates to identify directed diffusion paths and to render the directed diffusion paths as thread-like structures. Indications of at least flowing blood velocity and vorticity can also be rendered from MRI data or from simulations.

A first lighting model is preferably used to visualize volume layers containing the thread-like structures, and a second lighting model to visualize other volume layers.

The thread-like structures are preferably rendered so as to make them visually distinct from another and from other tissue by the use of a complementary volume, referred to as a halo, that is disposed around each thread-like structure.

The user interface employs a exploratory culling volume to interactively control the complexity of a visualized layer, and displays a plurality of widgets to a user for enabling the user to perform at least one of one-dimensional transfer function editing, two-dimensional transfer function editing, and two-dimensional barycentric transfer function editing of a rendered image. For example, the user interface includes controls for varying a density volume of visualized thread-like structures by varying at least one of a thread-length criterion and a diffusion rate criterion.

The system may be embodied by a computer containing at least one (commodity) graphics card that has 3D texturing capability.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein:

FIG. 7 illustrates a sequence of renderings of a thread density volume with increasing length threshold from left to right, where the right-most image shows only long thread paths.

FIG. 14 is a table that shows a preferred mapping from data values onto hardware texture channels.

FIG. 15 illustrates several mathematical expressions that are referenced in the detailed description of the invention.

DETAILED DESCRIPTION OF THE PREFERRED EMBODIMENTS

Figure 10:
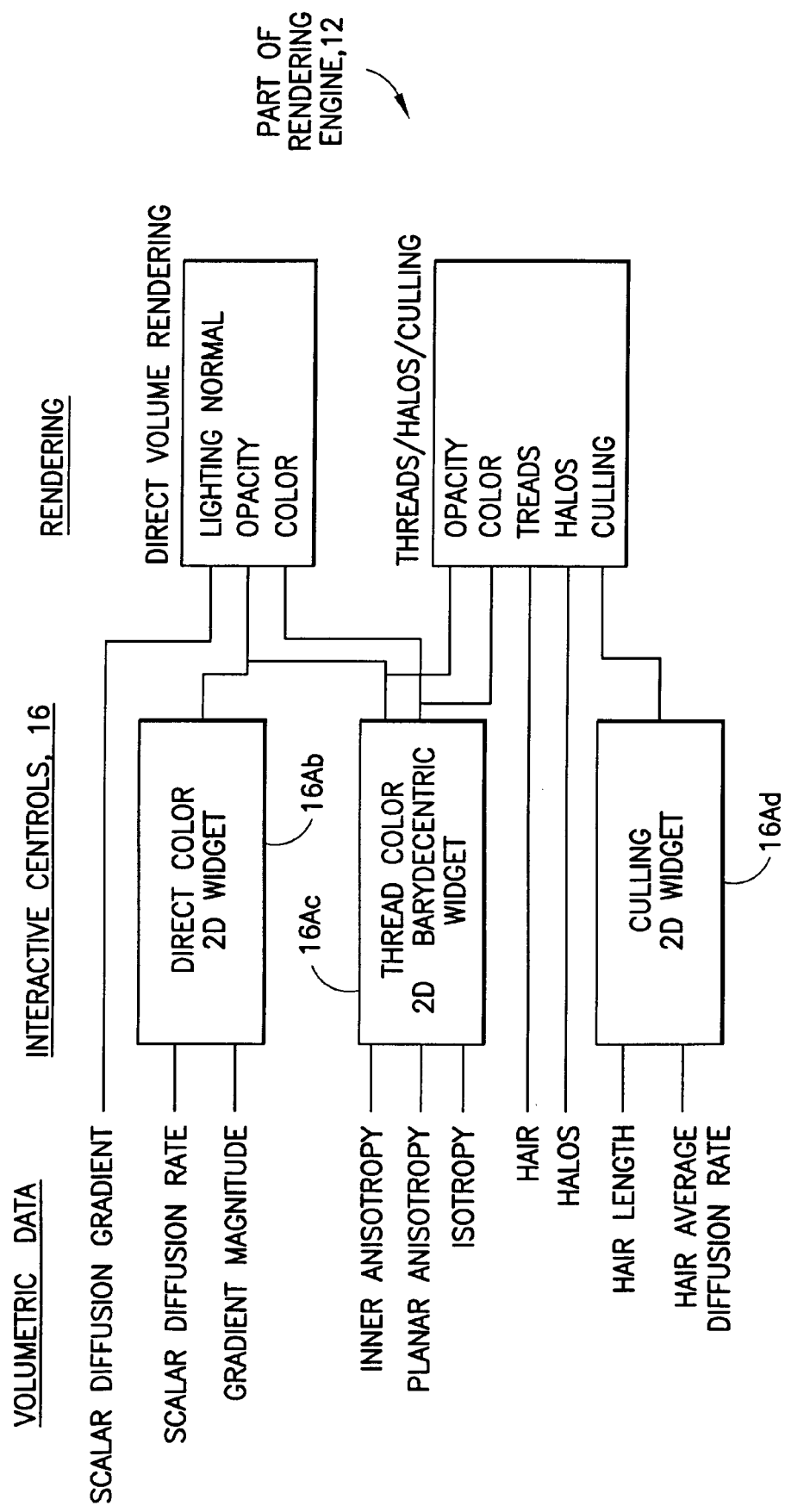
FIG. 10 is a data-flow diagram of the rendering setup for FIG. 8. Inputs are a tensor-valued diffusion rate image from which the volumes on the left are calculated. The interactive widgets in the center control how the quantities are displayed: some quantities are used to color layers, some to cull portions, some to show different types of diffusion, and so forth. The data, interactive controls, and layering are varied for rendering other types of datasets, but are analogous.
Figure 16:
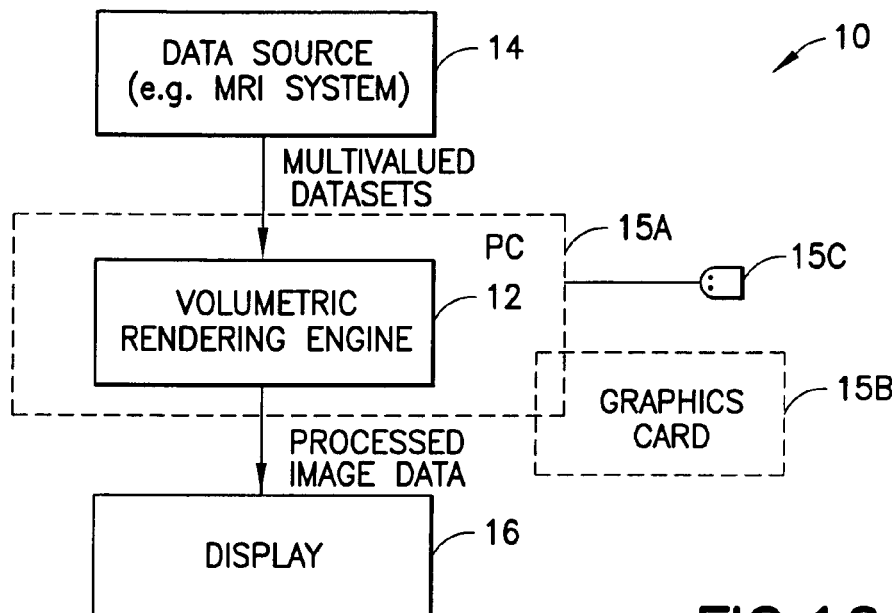
FIG. 16 is a high level block diagram of a volumetric rendering system for multivalue datasets.

FIG. 16 illustrates the volumetric rendering system 10 in accordance with an embodiment of this invention, where a volumetric rendering engine 12 receives input data from the output of a source 14 of multivalued datasets, such as a MRI system, and outputs processed data to at least one visual display 16, such as one or more high definition CRT or flat panel display screens (or stereo displays), or a stereoscopic display apparatus that is wearable by a user, or any suitable means for presenting a viewer with an image based on the processed multivalued data. FIG. 10, described in detail below, shows the construction of a presently preferred embodiment of the volumetric rendering engine 12.

It should be noted that in a typical embodiment the there are a series of images output by the rendering engine multiple times per second in an interactive mode of operation. It should further be noted that in another embodiment of this invention the MRI system 14 can be replaced by a computer that outputs the result of simulation calculations, such as fluid flow simulations, to the rendering engine 12. In a still further embodiment of this invention, the MRI system 14 can be combined with, or replaced by, another type of volume imaging modality.

The volumetric rendering engine 12 can be implemented entirely in hardware, entirely in software, or more preferably as a combination of hardware and software, such as by a programmed digital data processor, such as with a Pentium™-class personal computer (PC) 15A, that contains at least one graphics card or module 15B. A user interface; including the display 16 (or another display device) and a pointing device 15C, such a mouse or trackball, is preferably also provided. The graphics card or module 15B typically includes hardware registers and arithmetic units that operate under the control of a local graphics processor that executes graphics/display related commands and primitives under control of a program running on the host PC. This being the case, and as will be made apparent below, this invention also encompasses computer program instructions that are stored upon or within a computer-readable medium, such as a disk and/or semiconductor memory.

It is an aspect of this invention that the PC 15A and the graphics card 15B can be commodity devices, i.e., "off-the-shelf" items that are not required to be specially engineered to process and volumetrically render the multivalued datasets that are input to the rendering engine 12.

Figure 18:
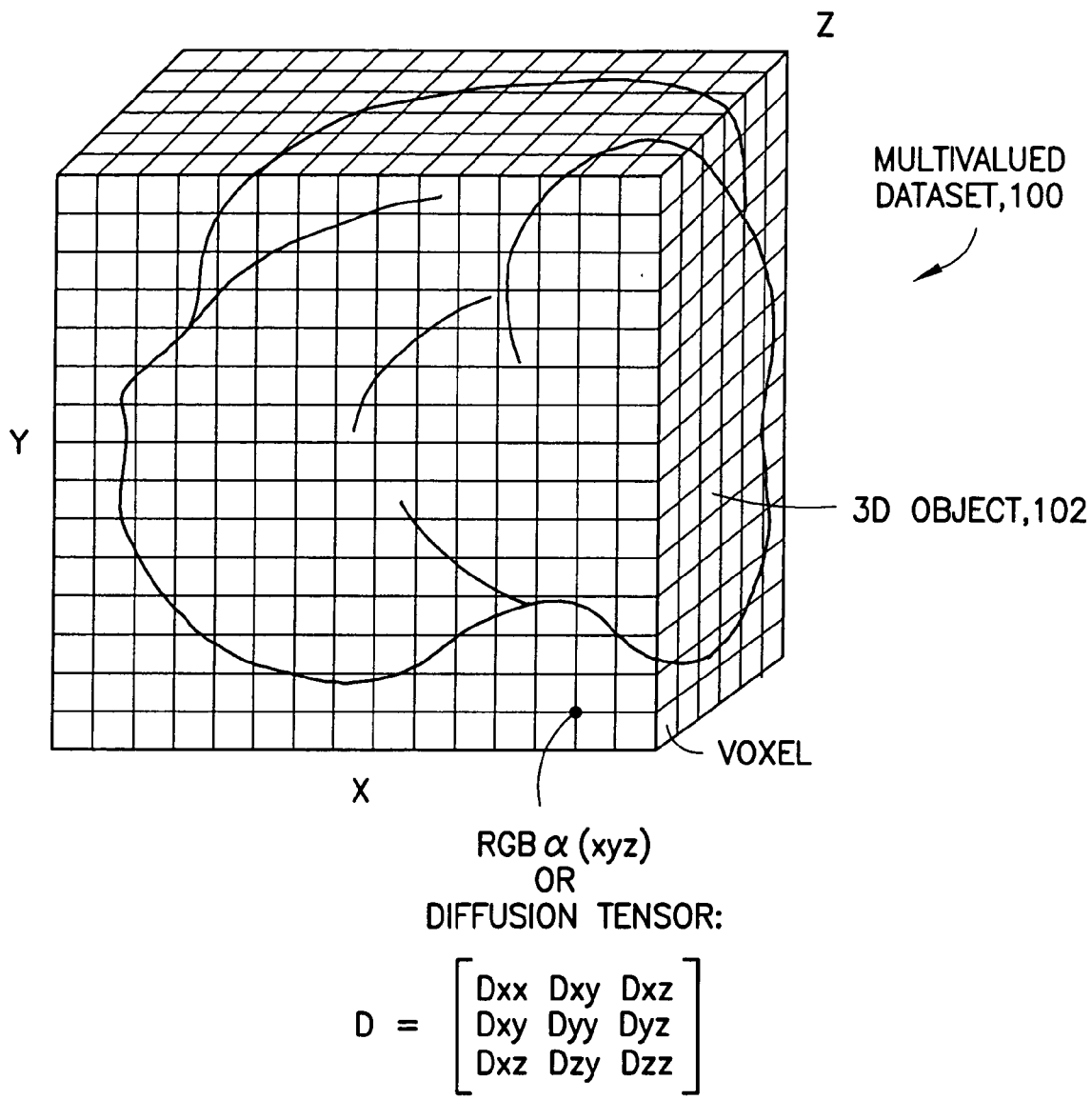
FIG. 18 is an illustration of a representation of a multi-valued dataset.

This invention extends the concept of multilayer 2D visualizations, and implements an interactive 3D analog to 2D compositing. FIG. 18 shows a representation of a multivalued dataset 100, where a 3D object 102 (e.g., a human brain) is represented by a stack of plurality of multivalued data points each containing, as examples only, Red, Green, Blue (RGB) and/or transparency (alpha) data, and/or second order diffusion tensor data. For example, there may be eight data values at each point in the three dimensional grid.

Figure 1:
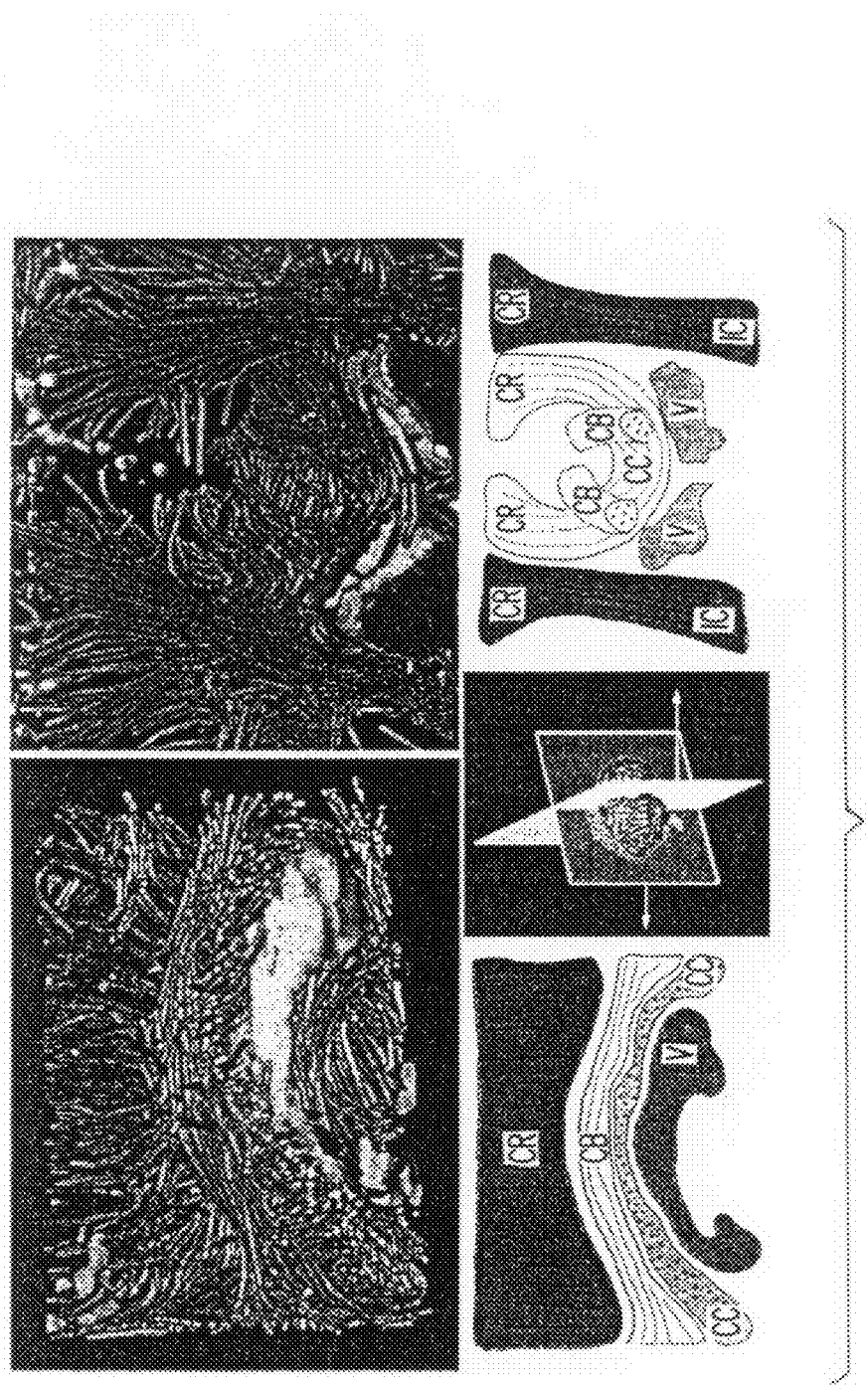
FIG. 1 illustrates interactive renderings of a human brain dataset.
Figure 2:
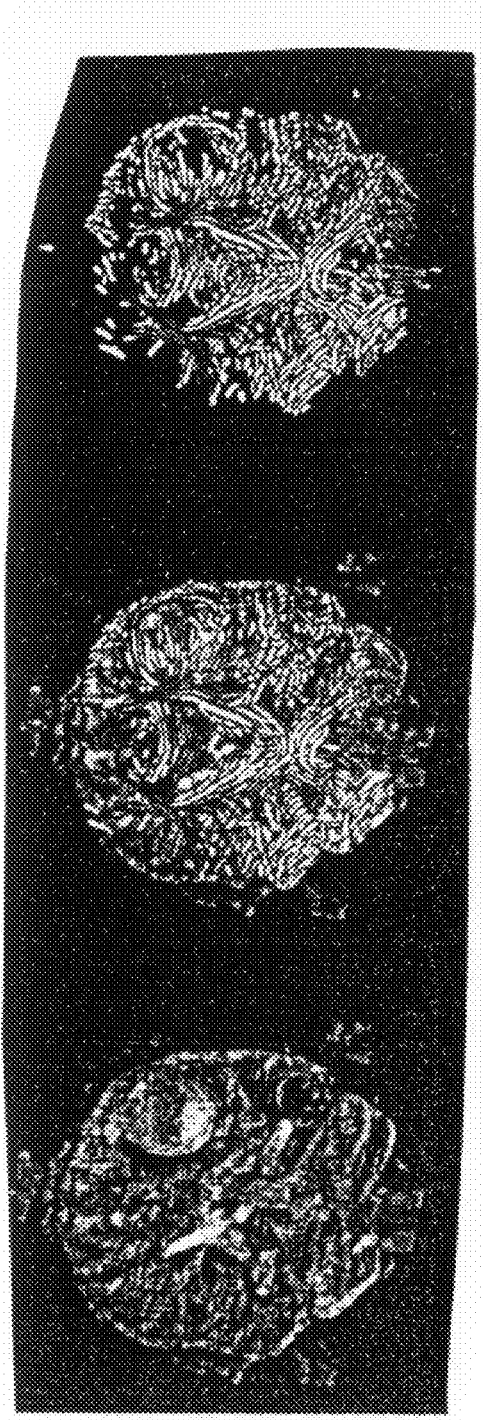
FIG. 2 illustrates, at the left, a direct-volume-rendered layer showing regions with different diffusion anisotropy, at the right: a "hair", or filament or thread, layer showing both the anisotropy and diffusion direction, and the two layers combined in the center image to show the significantly more informational content made possible by this invention, with little additional visual bandwidth requirement.

FIG. 1 shows an example of a volume rendering of seven-valued brain-imaging data. One layer of this rendering is a direct volume rendering conveying tissue type; two additional complementary layers show connectivity information with a thread-like representation, with halos augmenting the threads to clarify depth relationships. FIG. 2 illustrates how various layers can be combined.

The data for the renderings shown in FIG. 1 come from tensor-valued volumes of diffusion measurements acquired using the MRI system 14 of FIG. 16. The renderings (top) show collections of threads consistent with major white-matter structures; IC=internal capsule, CR=corona radiata, CB=cingulum bundle, CC=corpus callosum, diagramed at the lower portion of the Figure. Components of the tensor-valued data control thread direction, color, and density, as described below. Direct volume rendering simultaneously shows the ventricles (labeled V) in a distinct color (e.g., blue) for anatomical context. Interactively rendered halos around the threads clarify depth relationships. Interactive culling is shown in FIG. 7. The interactivity permits exploration of these complicated multivalued datasets in a manner not possible using prior art techniques.

Figure 3A:
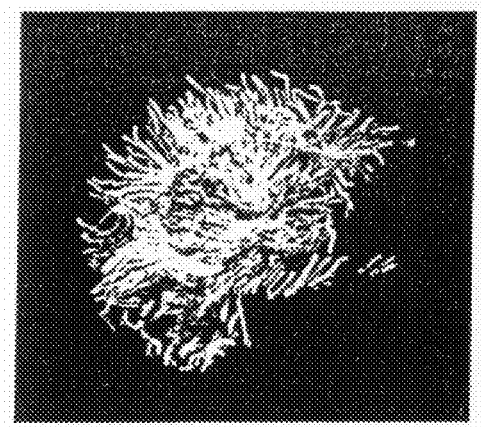
FIG. 3 illustrates thread volume showing brain connectivity information (the front of the head points right in both images), where halos, rendered only in the image shown in FIG. 3A, clarify the depth ordering and 3D structure as compared to the image shown in FIG. 3B.
Figure 3B:
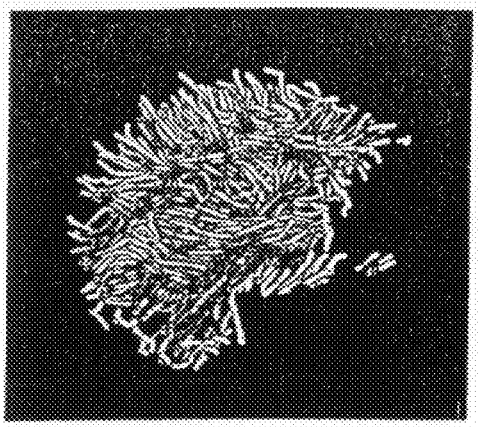
Figure 17:
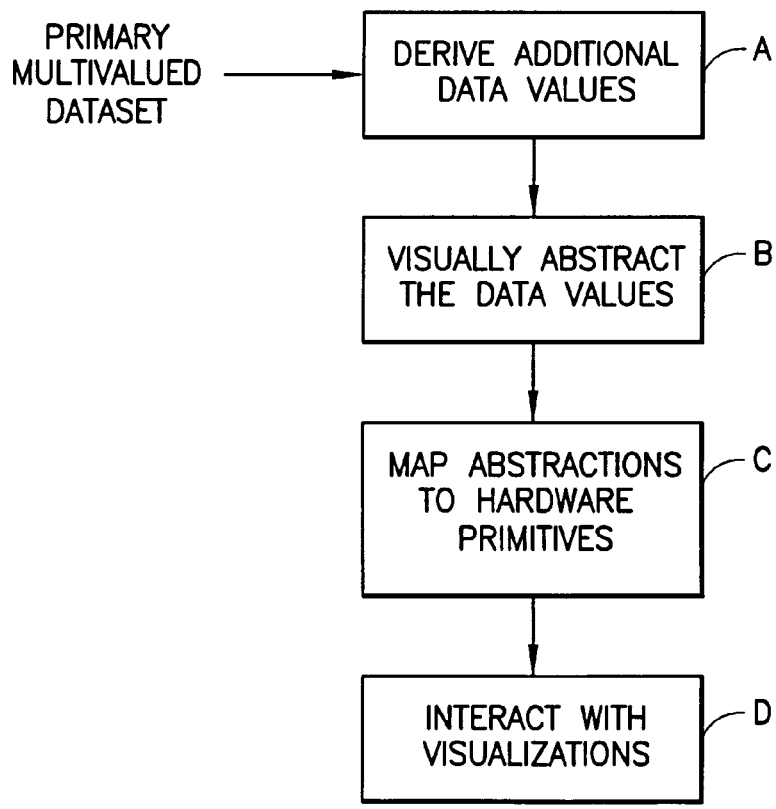
FIG. 17 is a logic flow diagram that illustrates a method in accordance with this invention.

As is shown in FIG. 17, a conceptual framework employed by this invention partitions the volumetric rendering process into four basic steps: (A) calculating additional data values from the primary data values, (B) deriving at least one visual representation from the primary data and the computed additional data values, (C) mapping the derived visual representation(s) through transfer functions to hardware primitives for rendering the visual representation, and (D) (optionally) interacting with the visualization. Representative images can be created from combinations of scalar, vector, and tensor fields, and may use a presently preferred "thread and halo" implementation to visually represent vector fields. FIG. 3 illustrates the thread representation with (FIG. 3A) and without (FIG. 3B) halos, where it can be seen that the use of the halos in FIG. 3A clarifies the depth ordering and the overall 3D structure. Also described below is a data-driven culling of the visualization.

As was noted above, a feature of this invention includes an ability to implement the volumetric rendering and other algorithms on the PC 15A using a commodity graphics card 15B, thereby reducing cost and complexity, and an ability for a user to interactively control, via pointing device 15C, at least a portion of the visual mapping through 1D and 2D transfer functions.

Discussed below is a detailed description of the processes of layering complementary volumes, specifying and creating layers, creating complementary thread and halo layers, interactive culling, and editing single-valued and two-valued transfer functions.

The Layered Volume-Rendering Framework

The four basic steps of the method of this invention shown in FIG. 17 can be restated as follows, where it is assumed that the method begins with primary multivalued volumetric data from a suitable source, such as experimentally acquired DTI (brain imagery datasets) and direct numerical simulation (flow data sets). These four steps are described below.

Calculate Derived Datasets (Step A)

In that the primary data is often difficult to interpret directly, the first step calculates derived volumes of data with more intuitive interpretations. For example, DTI datasets are second-order tensor fields. It is often useful to decompose these into several scalar and vector fields to reduce the problem of rendering a tensor field into one of rendering several simpler fields. Speed, derived from velocity, is such a derived quantity. Some derived quantities are not inherently simpler, but instead provide a different view of a dataset. Vorticity, a vector derived from velocity, is an example; as it captures the rotational component of velocity.

Define Visual Abstractions (Representations) (Step B)

In this step the method groups the data volumes into layers of volume-based visual representations. While some layers represent a direct mapping of derived values to a volume, at least one other layer preferably represents a computed visual abstraction or representation that elucidates the underlying data. The abstraction is converted into a volume. The visual abstractions chosen depend on characteristics of the derived data and the problem at hand. For example, neural connectivity can be portrayed with a set of thread-like fibers derived from the data and then scan-converted into a volume. Anatomical references, such as the skull or eyes, are another example; they help provide spatial context to a visualization.

The presently preferred layered approach provides flexibility in rendering and manipulating multivalued datasets. However, simultaneously visualizing two or more layers preferably involves representations that complement one another. For example, even elegantly structured representations can be difficult to comprehend, as they may be too densely populated to show regions of interest, or they may lack adequate depth cues. Designing good abstractions or visual effects, and good techniques to combine them, is a difficult but important component of the visualization process.

Map Data with Interactive Transfer Functions (Step C)

The mapping step defines transfer functions that assign color and opacity to data values and shader programs that control lighting parameters. Color and opacity mappings can be defined independently from the lighting model for each layer. The mapping step permits the method to decouple the data values from their visual representation, so that the visual characteristics of the data can be manipulated without changing the data itself. The presently preferred method provides three types of transfer functions: 1D, 2D, and 2D barycentric, although this invention is not limited to the use of just these three transfer functions. The 1D transfer function takes a scalar data value as an argument and returns a color and opacity. Both the 2D and 2Dbarycentric transfer functions take two input values and return a color and opacity.

Visualize and Explore (Step D)

In this step of the method the multiple volumes are rendered and interaction functions, referred to as widgets 16A (see FIG. 10), are used to control the visual appearance of each layer. The presently preferred texture-based volume renderer permits the method to execute interactively on the PC 15A with the commodity graphics card 15B. The texture-based volume rendering approximates the volume rendering integral.

The presently preferred embodiment uses view-aligned slices through a 3D texture and multiple rendering passes to draw all of the volumetric layers. As the volume is rendered, the method iterates through the slices from farthest to nearest and executes multiple shader programs per slice, one for each volumetric layer.

The pointing device 15C, such as a mouse, and the 2D widgets 16A placed in the screen space are used to manipulate visual attributes of each layer while exploring the dataset. The widgets 16A are linked directly to the transfer functions defined in the mapping step (Step C of FIG. 17).

Threads and Halos

Figure 4A:
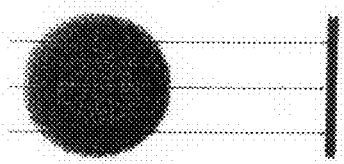
FIG. 4A illustrates the path of virtual rays of light through a cross section of a volumetric thread, where the middle light ray passes through a small section of the black halo and a large section of a colored (e.g., red) thread, where the resulting color in the volume rendering is a dark red. The other light rays pass only through the black halo of the thread, resulting in the color black.
Figure 4B:
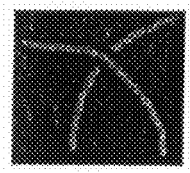
FIG. 4B is a rendering of two threads, where when rendered the use of the volumetric halo technique produces a "gap" that enables the viewer to clearly see that the thread traveling from the top-left of the image to the bottom-right passes in front of the other thread.

By extending hair-rendering techniques such as Kajiya and Kay's texels and Lengyel's shell textures, the method represents continuous directional information using threads (see FIG. 1). Generally, the volume is densely populated with paths so as to represent as much of the underlying data as possible. The choice of a dense and representative set of paths has been found to display the data faithfully and completely. To clarify individual paths, the method preferably adds a "halo" (see FIG. 4, and compare FIG. 3A to FIG. 3B) around the threads to make them visually distinct. This interaction mode can be referred to as exploratory culling, as it selectively displays paths meeting certain criteria. FIG. 3 shows a thread density volume with and without halos: where it can be seen that without the halos, it is particularly difficult to identify individual threads. FIG. 4 shows the effect of a halo in clarifying the depth relationship.

The thread and halo volumes are preferably precalculated, and each thread in the volume corresponds to one path. Note that since the paths are represented in a volume, the rendering time is independent of the number of paths displayed. However, the diameter of the paths is a function of the resolution of the volume.

Figure 6A:
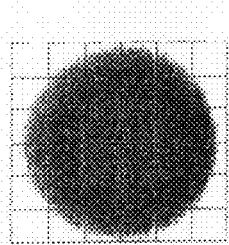
FIG. 6 illustrates the filtering of a halo into a volume (2D view), where in FIG. 6A the thread is shown with a black halo around it. The curve labeled A in FIG. 6B is the filter for the thread, and the curve labeled as B is the filter with which the halo is generated.
Figure 5A:
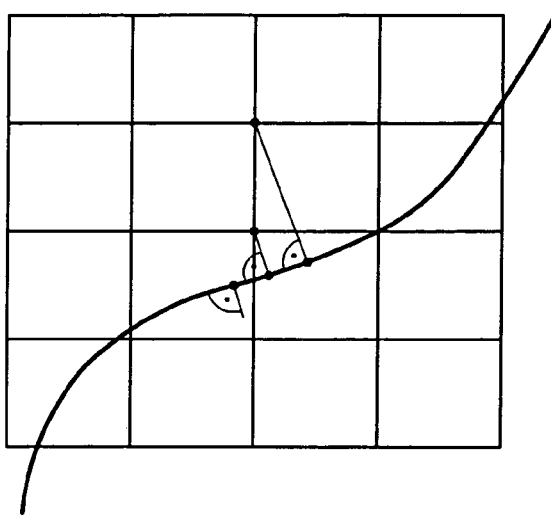
FIG. 5 illustrates the filtering of a path into a volume (2D view). For each voxel within a radius of two voxels from a path, the shortest distance to the path is used as the input to the filter (FIG. 5B). The grid shown in FIG. 5A depicts single-voxel spacing, as does the horizontal axis of FIG. 5B.
Figure 5B:
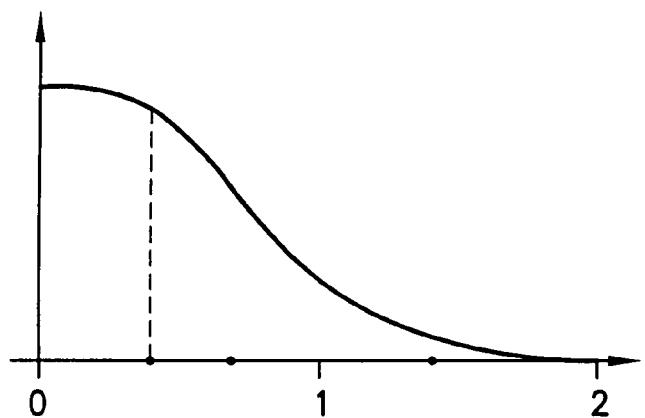
Figure 6B:
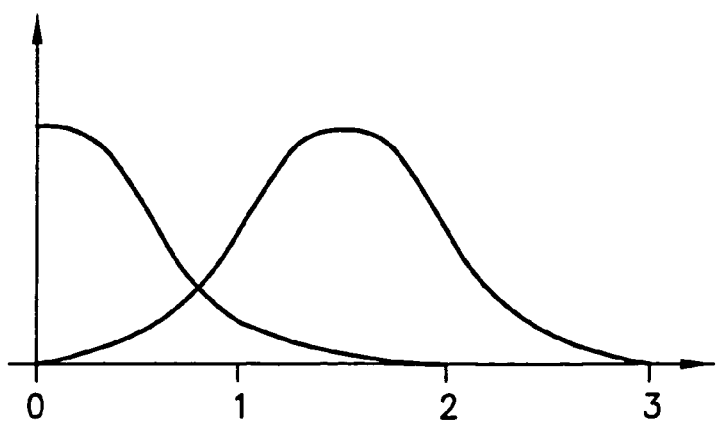

The paths and halos are filtered into volumes using, preferably, a cubic B-spline filter that has a support of four voxels for the thread, as shown in FIG. 5, and six voxels for the halo, as shown in FIG. 6.

Lighting for the thread is preferably calculated using the model described by D. C. Banks, "Illumination in Diverse Codimensions", in *Proceedings SIGGRAPH '94*, ACM, 1994, pp. 327-334, which defines intensity as shown in Equation 1 in FIG. 15. In Equation 1 $I_t$ is the combined output color from the transfer functions, N the normal, T the tangent, L the light vector, H the vector halfway between the light vector and the view vector, and p the excess-brightness diffuse exponent.

Layering Volumes

The presently preferred embodiment of the volume-rendering engine 12 uses a single stack of view-aligned texture-mapped slices, rendered back to front. Lighting for the thread and halo layers is computed as in Equation 1. For all other volume layers, a Phong lighting model (shown in Equation 2 of FIG. 15) is preferred for use. As in the thread lighting model, in Equation 2 $I_t$ is the combined output color from the transfer functions, N the normal, T the tangent, L the light vector, and H the vector halfway between the light vector and the view vector. In addition, $k_a$ is the ambient contribution, $k_d$ the diffuse contribution, and n the specular exponent.

The presently preferred embodiment of texture-based volume rendering is embedded into a rendering framework built on top of a V R library of V R Juggler (see Blerbaum et al., "V R Juggler: A Virtual Platform for Virtual Reality Application Development", in *Proceedings of IEEE VR 2001*, 2001.) V R Juggler provides a coherent application development environment for this and other related interactive virtual-reality applications.

All datasets are mapped, preferably but not by necessity, to OpenGL (www.opengl.org) 3D textures that have a resolution of $256^3$ samples. The volume rendering engine 12 may be implemented on the PC 15A equipped with, by example, either a NVidia GeForce4™ Ti4600, or a NVidia Quadro4™ 900 XGL graphics card 15B component (www.nvidia.com, NVidia Corporation, Santa Clara, Calif.). Both of these graphics cards have 128 MB of texture memory, support 3D textures and texture compression, and provide hardware for programmable texture blending. Rendering is performed using OpenGL with several extensions, including a texture shader and register combiner available from Nvidia and a generic texture-compression extension ARB_texture_compression. The preferred embodiment also utilizes NVidia's texture-shader and register-combiner specification tool, NVParse™, which enables one to quickly change the shader programs for the different layers without recompiling the volume renderer. Additional specific details of the implementation of the layered volume rendering engine 12 are further described below. It should be realized, however, that the described embodiment, including the specifically referenced hardware components, software modules and the like, are exemplary, and are not to be construed in a limiting sense upon the practice of this invention.

Mapping Visual Representations into 3D Textures

To make volumetric data available for hardware-accelerated rendering it is preferably packaged into OpenGL 3D textures. Even though textures normally consist of the three colors RGB, and possibly an additional transparency or alpha value A, it is not necessary to store color information in the four channels. In fact, it is preferred to use the four channels to store the data values from the visual representations. In the exemplary embodiment there exists a restriction of eight bits per channel due to texture-memory limitations on the presently preferred PC graphics card 15B. Therefore, the data is quantized to fit in the range 0-255. The table shown in FIG. 14 illustrates how the data values from four examples (T2-weighted MRI, direct-volume-rendered DTI, streamtubes and direct-volume-rendered fluid flow) are mapped into the RGB and A channels of the graphics card 15B.

Compression of Volumetric Datasets

The volumetric data is stored in compressed OpenGL 3D textures. For a $256^3$ RGBA texture with eight bits per channel the data is 64 MB. A. GeForce4™ graphics card has available 128 MB of texture memory that must be shared with the frame buffer, the textures for the transfer functions, and display lists. In this case, then it would be impossible to show more than one layer at a resolution of $256^3$ without some type of data compression. Using the generic OpenGL texture compression extension ARB_texture_compression provides a 4:1 compression ratio, which reduces the 64 MB to 16 MB for a single $256^3$ 3D texture. This improved memory efficiency enables the rendering engine 12 to store multiple layers in texture memory, which is desirable for implementing interactive rendering.

Texture-Shader Program

The texture-shader program specifies the textures to fetch, how to fetch them, and the assignment of the interpolated fragments to registers. Four textures are fetched and assigned to registers tex0 to tex3.

In order to achieve interactive frame rates, manipulating large, compressed 3D textures is preferably avoided. Thus, it is preferred to perform texture manipulation with transfer function textures. In this respect one may rely on the dependent texture lookup capabilities of modern graphics cards, i.e., the capability to use the output of one texture lookup as the coordinates to another texture lookup. The following texture-shader program in the NVParse™ format is typical of those that are employed by the rendering engine 12.

!!TS1.0
texture_3d(); //load texture 0
texture_3d(); //load texture 1
dependent_gb (tex1); //define texture 2
dependent_ar (tex1); //define texture 3

In the foregoing the rendering engine 12 first fetches two 3D textures (0 and 1) and assigns the interpolated fragment to the registers tex0 and tex1. Next, two dependent-texture lookups are performed, the first based on the green and blue (gb) channels of register tex1 and the second based on the alpha and red (ar) channels of register tex1. As an example, the green and blue channels of the 3D texture assigned to the register tex1 may hold the two MRI diffusion anisotropy metrics. These two values are used as the coordinates for a texture lookup into the texture of the 2D barycentric transfer function assigned to register tex2. The output is a color and opacity for the current fragment based on diffusion anisotropy. The definition of texture 3 is analogous to that of texture 2, i.e., by indirect lookup.

Register-Combiner Program

The register-combiner program defines how textures are blended together. In reference to the presently preferred hardware embodiment, the register-combiner stage on a GeForce3™ or higher graphics card provides eight general combiners and one final combiner to calculate the final fragment color from the data in the register set. For each combiner one may define input mappings on the input registers and scale and bias on the output registers. The combiner itself enables one to perform simple operations such as dot product, element-wise multiplication, and sum.

The volume rendering engine 12 performs texture blending as well as lighting calculations using the register combiners. Two lighting models are implemented in the register combiners, one based on Equation 1 and one based on Equation 2. The light vector L and halfway vector H needed in the lighting calculations are passed in through the constant registers cont0 and const1 of the first general combiner. These two registers are processed in the first combiner in order to be able to use the light and halfway vector in any of the calculations. This is the only convention required for the shader programs, and introduces no major restrictions.

Compositing Volume Layers

The following pseudocode describes the rendering process performed by the rendering engine 12:

```
for all slices back to front
    for all layers/shader programs
        activate the appropriate texture units
        bind textures
        bind texture shader program
        bind register combiner program
        set current light and half-way vector
        push texture transform on the texture stack
        render the slice
    end
end
```

It is desired that the pseudocode be executed on an ordered sequence of view aligned slices, where the slices are arranged in order from back to front. When the blending function is set to GL_SRC_ALPHA and GL_ONE_MINUS_SRC_ALPHA, this sequence produces the desired rendering containing information from all layers.

Each slice is rendered multiple times, once for each volume layer. Since each layer-rendering pass for a slice can obscure a portion of the previous one, the passes are ordered to ensure that the layers work together. It is presently preferred to render the direct-volume-rendered layers first, the halos second, and the threads third. The direct-volume-rendered layers tend to reveal large structures and surfaces that are readily discernable beneath the more finely detailed thread and halo layers. Rendering the thread layer last has been found to increase their brightness, thus making them even more visually distinct.

Exploratory Culling

Interactively culling portions of the data using data-derived criteria has been found to provide a powerful data-exploration tool for removing excessive detail and exposing structures of interest. By labeling structures in the visual representation layers, and assigning those labels to transfer functions, it is possible to control the color and opacity of entire structures. This approach is particularly useful for the thread paths. It is often unclear beforehand how many paths to generate for the thread density volume, as there is a tradeoff between generating too few paths and generating so many that the volumes become cluttered. By labeling each thread path with a parameter, e.g., path length, and selecting with a transfer function criteria based on one or more features, it is possible to interactively cull out paths that meet certain criteria (e.g., to cull out all threads having a length less than a threshold length (see, for example, FIG. 7)).

In the approach of Zhang et al., "Streamtubes and Streamsurfaces for Visualizing Diffusion Tensor MRI Volume Images", in IEEE Visualization 2000, changing culling parameters required an entire preprocessing step that requires some number of minutes or even hours to execute. With the exploratory culling mechanism, however, certain parameters can be changed interactively, enabling the user to better determine which parameter values are the most effective. FIG. 7 shows the effect of varying one such parameter (thread length) on a visualization. Other parameters that can be employed include, but are not limited to, thread width, average diffusion rate, minimum or maximum diffusion rate, average velocity, minimum or maximum velocity and magnitude of vorticity.

Interactive Manipulation

Figure 8:
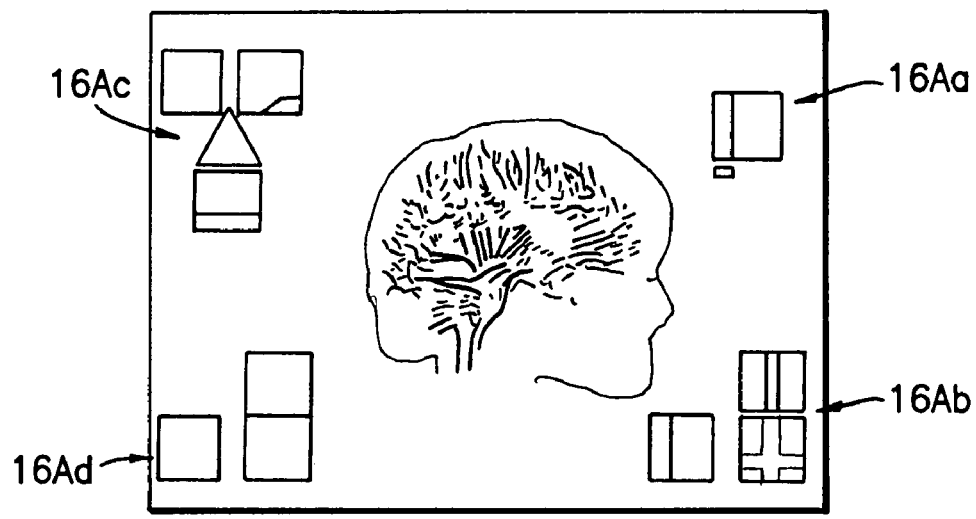
FIG. 8 illustrates an embodiment of the interactive exploration tool. Clockwise from upper left are a 2D barycentric widget, an ID widget, a 2D Cartesian widget, and a 2D Cartesian culling widget. The centrally-located data are derived from a 3D second-order tensor field and a 3D scalar field acquired with MRI. The threads represent the tensor; the scalar is shown in a direct-volume-rendered layer.

The invention provides a plurality of on-screen widgets 16A to control transfer functions and to enable the user to change the volume's appearance in real time. FIG. 8 shows one such interactive application. Each of the widgets 16A defines a texture that corresponds to an underlying transfer function of the form 1D, 2D, or 2D barycentric. For all of the transfer-function manipulation widgets 16A, the color representation is HSV. In all cases, in the presently preferred but non-limiting embodiment, color is manipulated along the 1D axes and the results combined.

Figure 9:
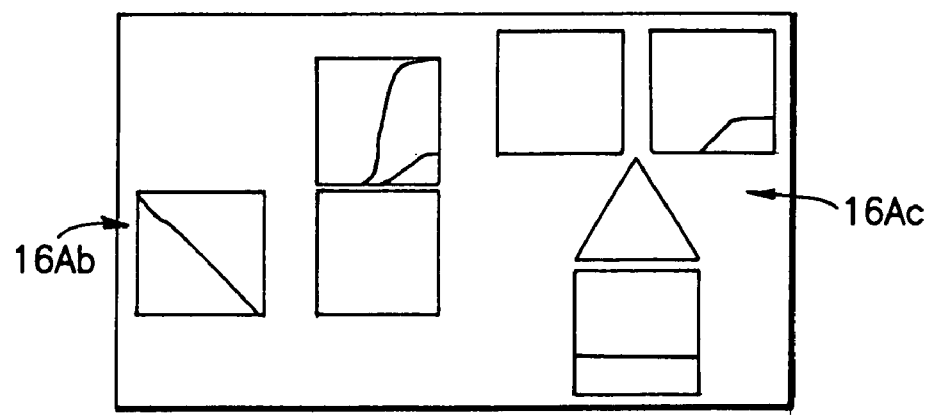
FIG. 9 illustrates two 2D transfer function manipulation widgets. On the left, the tensor-product widget combines the output from two ID manipulators. On the right, the barycentric widget combines the output from three, one for each edge of the triangle. Color is specified in HSV-alpha. The curves shows hue, saturation, blue value, and alpha.

The 1D manipulation widget 16Aa directly specifies the colors and opacities over the entire 1D domain. The 2D manipulation widget 16Ab specifies color and opacity along each of the two axes (see FIG. 9, the left side). The colors for the 2D domain are generated by averaging the colors of the two axes, while the opacities are combined multiplicatively. The 2D barycentric manipulation widget 16Ac defines colors and opacities over a triangular space. This is useful for the brain-diffusion-imaging application of this invention because it manipulates the anisotropy metrics naturally. In this application, the vertices of the barycentric space represent spherical (isotropic) diffusion $c_s$, planar diffusion $c_p$ and linear diffusion $c_l$ (defined in C. -F. Westin et al., "Geometric Diffusion Measures for MRI from Tensor Basis Analysis", in *Proceedings of ISMRM* 1997, 1997). In the preferred embodiment the user manipulates the color along each of the three edges (see FIG. 9, right). The color and opacity over the domain are generated by the weighted average of the colors and opacities on the three edges.

Typical rendering rates have been found to be four to five frames per second. Clipping planes help isolate regions of interest and increase the frame rate so that zooming in on those sections does not significantly slow the rendering rate. A high-resolution screen-capture feature enables a user to quickly navigate to interesting data views and capture high-resolution images of them with minimal additional waiting.

Neuroimaging Results and Discussion

A first application of interest involves using neuroimaging data to understand the brain. The data is acquired using the MRI system 14 and are of two types: second-order tensor-valued water-diffusion-rate images and scalar-valued anatomical images. The scalar-valued data are typical T2-weighted MR images.

At each point in a volume, the tensor-valued data capture the rate at which water is diffusing through tissues. The diffusion rate is different in different areas, in regions of pure fluid, it is fast; in denser tissues such as bone, it is slow. The rate of diffusion can also be directionally dependent, particularly in fibrous tissues such as axon tracts and muscles, diffusing more quickly along the fibers than across them.

An ellipsoid is an effective visual representation for one diffusion-rate measurement. Its shape is analogous to that of a small ink drop that has diffused for a fixed time: fast, isotropic diffusion yields a large sphere; while anisotropic diffusion that is faster in one direction yields a cigar-shaped ellipsoid aligned with that direction.

These diffusion-rate measurements provide a new view into the brain. Their correlation with white-matter structures is particularly intriguing to neurologists. This directionally-dependent diffusion rate information thus can potentially give neurologists insight into brain connectivity, make possible a better understanding of neuropathology, and can permit enhanced treatment planning for neurosurgery.

Primary and Derived Neuroimaging Data

A first primary MRI dataset is a second-order tensor field measuring the water diffusion rate. Each value D is a symmetric tensor with real, positive eigenvalues. From D the method derives several other measures (Step A of FIG. 17). First, the three scalar anisotropy measures introduced by C. -F. Westin et al., "Geometric Diffusion Measures for MRI from Tensor Basis Analysis", in *Proceedings of ISMRM* 1997, 1997, $c_l$, $c_p$ and $c_s$, describe how close to a line, a plane, or a sphere the corresponding ellipsoid shape is for a given measurement. These measures are all positive and sum to one. Reference can be made to Equation (3) in FIG. 15 for showing the derivation of the three scalar anisotropy measures $c_l$ (linear), $c_p$ (planar) and $c_s$ (isotropic), and illustrates the sorting of eigenvalues and eigenvector according to the eigenvalues (where $\lambda_1 \geq \lambda_2 \geq \lambda_3$). Second, the trace of D, Tr(D), is equivalent to the sum of the eigenvalues of D and gives a scalar measure of the overall diffusion rate. Third, the gradient of the trace, grad_Tr(D) and the magnitude of that gradient, mag(grad_Tr(D)), describe how the diffusion rate is changing and in what direction. In the preferred embodiment these quantities are used in lighting calculations (see the table shown in FIG. 14).

A further derived data set can be a set of paths through the tensor field that represent the directions of diffusion. These paths are calculated and distributed within the volume as described by, for example, Zhang et al. ("Streamtubes and Streamsurfaces for Visualizing Diffusion Tensor MRI Volume Images", in IEEE Visualization 2000; Zhang et al., "Visualizing diffusion tensor MR images using streamtubes and streamsurfaces", *Transactions on Visualization and Computer Graphics*, (to appear); and Zhang et al., "An immersive virtual environment for DT-MRI volume visualization applications: a case study", in *Proceedings of IEEE Visualization,* 2001), and follow the direction of fastest diffusion in linear regions. In planar regions, they stay within the plane formed by the major and medium eigenvectors, following whichever is more consistent with the path to that point. They are not present in isotropic regions.

The second primary dataset is a T2-weighted image scalar field showing anatomy. From it the method derives the gradient of the value and the gradient magnitude, which aid in defining how fast the value is changing and in which directions. These derived values are also used in the lighting calculations. It is preferred to also derive the second directional derivative to aid in defining boundaries between homogeneous regions.

The combination of the diffusion and T2-weighted data clearly provide a multivalued dataset, as could, by example, a combination of the diffusion data and T1-weighted data, or T1 and T2-weighted data, as could a combination of diffusion or T2-weighted data with velocity data, or magnetization transfer data, or perfusion data, or data derived from a simulation, as a few non-limiting examples.

Further, the primary dataset could also be derived in whole or in part from another type of system, such as from a CT scanner, a positron emission tomography (PET) system, a functional MRI, a multi-electrode EEG or MEG, a confocal microscope, a multi-photon microscope, or an optical projection tomography (OPT) system, to name a few examples. Combinations of data from different types of systems may thus also be employed to form a multivalued dataset, such as data obtained from the MRI 14 and data obtained from a PET system.

Neuroimaging Examples

FIG. 1 shows detail of a diffusion dataset from a normal volunteer. A number of large white-matter structures are clearly visible, including the corpus callosum, internal capsule, corona radiata, and cingulum bundle. Of particular interest in this rendering is the variation in anisotropy along the threads. Relationships among the structures are also suggested at certain locations.

FIG. 2 shows a dataset from a patient with a brain tumor. Direct volume rendering captures the tumor as an opaque mass and threads show the diffusion direction and anisotropy around it. One can note the cradle of threads surrounding the tumor. From this visualization of in vivo data, a mechanism for the cradle has been hypothesized, including the distinguishing increase in planar anisotropy (see Zhang et al., "Application of DTI visualization and analysis on a data set from a brain tumor patient", in *Proceedings of IEEE Visualization*, October 2002.

FIG. 8 shows a second diffusion dataset from a normal volunteer rendered using three layers. The direction of fastest diffusion is again shown via thread-like tubes. Traditional direct volume rendering provides a semi-transparent view of the T2-weighted volume in some regions, and a relatively opaque portion in fluid-filled regions, e.g., the interior of the eyes and ventricles deep in the brain.

In accordance with an aspect of this invention, FIG. 10 shows the mapping from the scalar-valued and tensor-valued volumes onto a direct-volume-rendered layer, a thread layer, and a halo layer. The first layer directly renders the T2-weighted image to provide anatomical context for the remainder of the features. The hyper-intense fluid-filled regions were selected by interactively editing three transfer functions that are combined multiplicatively to yield an alpha value. The transfer functions take as input three scalars: the image value, the magnitude of its gradient, and a directional second derivative (to give improved control over the display of anatomical boundaries). The ventricles, the fluid-filled region in the center of the brain, have been found to be an excellent landmark for neuroscientists studying these datasets. Color for this layer can be specified through a transfer function based on the anisotropy metrics: e.g., isotropic regions are blue, regions with linear anisotropy red, and regions of planar anisotropy green. Lighting calculations are done using alpha, and the gradient of the image value as a normal vector (see Equation (2)).

The second layer renders a thread texture. The visible portions of this Figure were interactively selected via an alpha value calculation based on three criteria. Each criterion is the basis for an alpha value; and the three alpha values are combined multiplicatively. First, a transfer function maps the anisotropy metrics to alpha. For this rendering, areas of relatively high anisotropy are shown. Second, each path can be selected based on its length and on the average diffusion rate along it. In this rendering all paths are shown. Third, the thread density is directly provided as alpha. Lighting calculations are done using the alpha value created from the anisotropy metrics and the tangent of the thread density volume (see Equation (1)). The third layer renders halos for the thread texture. The value of alpha is calculated as for the thread, except that the halo density volume is used in place of the thread density volume.

FIG. 7 shows how different length paths can be selectively displayed. All paths are present on the left, short paths removed in the center, and short and medium paths removed on the right. As the shorter paths are removed, it becomes easier to visualize some of the large white-matter structures, e.g., the internal capsule and its projection through the corona radiata. Controlling this parameter interactively can thus facilitate gaining an overall understanding of the large structures, the more detailed small structures, and their relationships.

Simulated Blood Flow in a Bifurcated Artery Model

Figure 11:
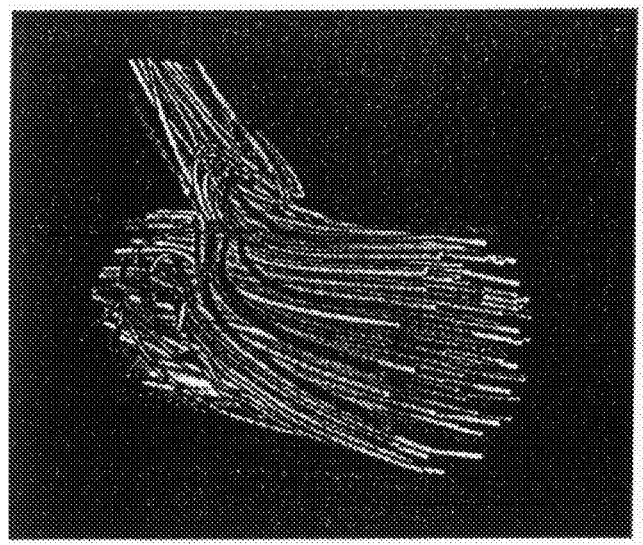
FIG. 11 illustrates a simulated flow, from right to left, through a model of a branching coronary artery. Several complex structures can be seen, including reversal of flow direction, as illustrated by the thread streamlines in the side branch immediately downstream from the bifurcation. The semi-transparent white shell represents vorticity magnitude and gives near-the-wall context for the streamlines.
Figure 12:
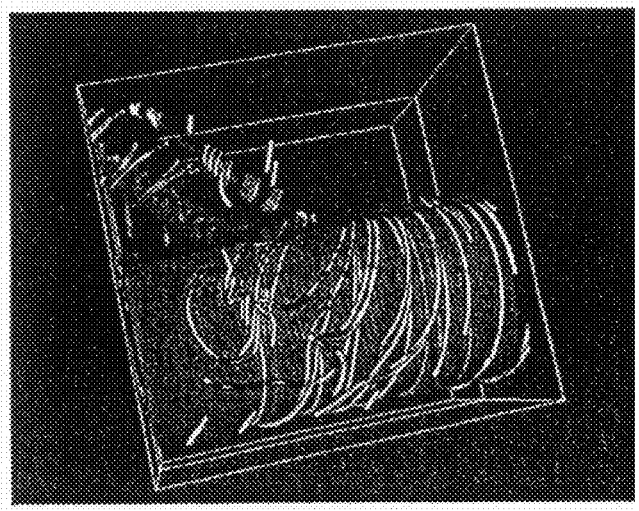
FIG. 12 illustrates integral curves through the vorticity vector field for the flow illustrated in FIG. 11. These vortex lines give additional clues to the flow structure, particularly in areas where it curves and varies in speed.
Figure 13:
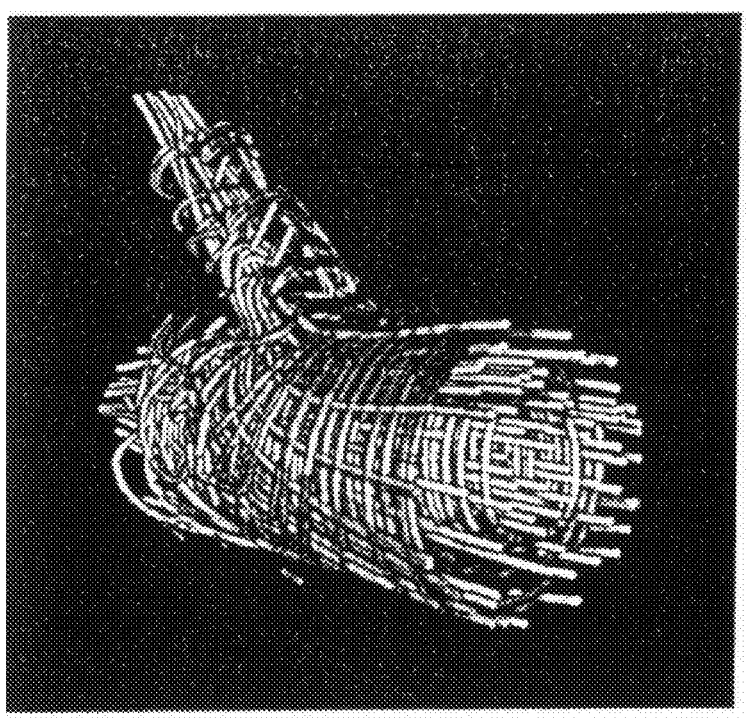
FIG. 13 shows integral curves through both the velocity and vorticity vector field for the same flow as illustrated in FIG. 11. Correlations among these vector fields can represent important flow structures.

A further exemplary application of this invention involves simulated fluid flow data on incompressible flow through an idealized model of a bifurcating coronary artery. What is rendered in FIGS. 11, 12 and 13 is one time-step of apulsatile flow. One important goal is to make a determination of how the flow structure is related to atherosclerotic lesion formation. Lesions tend to form opposite branches in arteries. It is hypothesized that upstream flow structure may provide important insight into why this type of lesion formation occurs. A visual representation displaying as much data as possible facilitates the exploration of the flow structure. In this regard, the volume visualization is particularly useful both because it displays multivalued volume-filling data in each image, and because it allows the user to interactively change how different values are displayed.

Primary and Derived Fluid Flow Data

The primary data for this application is a 3D velocity vector field. From this, a number of quantities can be derived. Speed, a scalar field, is the velocity's magnitude. Vorticity, a vector field, is a component of the first derivative of the velocity and captures the local rotational component of the flow. The vorticity vector points along the axis of rotation and its magnitude indicates the rate of rotation.

Flow Examples

FIG. 11 shows an idealized model of a branching coronary artery. Flow is from right to left, starting in the open end and proceeding down the main artery and into the side branch. Haloed thread streamlines, which may be colored according to speed, are rendered together with a diaphanous shell showing relatively low-vorticity regions. A more opaque section at the point of bifurcation can be used to show the region of highest vorticity.

The same flow is rendered in FIG. 12. In this image threads-of certain color can be used to show vortex lines integrated through the vorticity vector field, and a semitransparent form shows low-speed regions.

It can be appreciated that these two images together show important flow features not seen with other visualization methods, including near-wall kinks in vortex lines and localized looping structure in the vorticity. The kinks were found to approximately fit into the upstream edges of separation pockets evident in velocity images. The velocity and vorticity lines are layered together in FIG. 13 (the input data cropped to because of limited texture memory). Visualizing the vector fields simultaneously can be seen to dramatically clarify correlations among features.

Exploratory Culling

Exploratory culling (Step D of FIG. 17) enables a user to quickly generate a broad spectrum of images from the same dataset. The three dramatically different views of the neuroimaging dataset in FIG. 7 were created by culling paths by length. Long paths often illustrate the major structures in a DTI dataset, and smoothly transitioning between a view of just long paths to a view including all paths is useful to contextualize and understand features in the data. Culling paths according to the average diffusion rate along each has also proven useful in helping distinguish the most coherent paths. Since the culling operations work at interactive rates, they facilitate quick exploratory, experimentation with the data.

Exploratory culling is implemented as a transfer function controlled by a manipulation widget 16A, just as the other transfer functions. However, unlike the other transfer functions, reasonable values for the alpha of the culling transfer function are generally restricted to zero or one; as intermediate values do not normally give useful results. Thus, it may be possible to reduce the culling transfer function to a single bit, and still maintain most of its utility. By so doing the implementation can be simplified, or alternatively one may implement additional functionality using the additional bits.

2D Transfer Functions

The 2D transfer-function editing may be a simple blend of two 1D transfer functions. More sophisticated transfer-function editing provides more control over the resulting images, and may aid in generating a better understanding of the data. For example, it may be desirable to separate out regions of differing anisotropy more precisely, or to use the derivative information to display tissue boundaries more accurately.

Avoiding Thresholding

Thresholds in visualization are often problematic, because they introduce apparent boundaries where none exist. In DTI visualization, the mapping of an anisotropy metric to a binary region of anisotropy introduces such a boundary, as is evident by a review of in earlier DTI visualization work. The use of this invention avoids such boundaries by making smooth transitions in the transfer functions whenever possible.

Threads and Halos

Several different thread lighting models may be used, such as those suggested by Kajiyaand Kay, "Rendering Fur with Three Dimensional Textures", in Proceedings SIGGRAPH '89, ACM, pp. 271-280, and Banks, "Illumination in Diverse Codimensions", in *Proceedings SIGGRAPH '94*, ACM, 1994, pp. 327-334, with excess brightness exponents of p=2 and p=4. The actual value of p introduced by Banks is about 4.8. Kajiya and Kay's lighting model is similar to that of Banks, with an excess brightness exponent of p=1. The smaller the exponent, the brighter the thread and the less dramatic the lighting. It has been found that a lighting model that uses p=2 works well, as it brightens the threads and compensates for the overall darkening effect of the halos. Another advantage of using p=2 is that it requires no square-root calculation, which significantly speeds up processing.

The use of shadows improves visual perception of the thread volumes, and thus augments the use of the halos, but at the expense of additional calculation load.

Design

When rendering layers of volumes, it is important to design the layers to visually complement one another. Just as the layers of a painting cooperate with one another to convey a coherent theme, volume layers should be carefully designed so that they function together. That is, each layer is preferably designed with a sense of its impact on the appearance and effectiveness of the other layers.

FIG. 2 shows a partly deconstructed layered volume. On the left is depicted a direct-volume-rendered layer for a brain visualization, and on the right is a complementary thread layer. The center image shows the composite rendering of both layers. In order to produce a composite rendering such as this, care must be taken throughout the design process to ensure that the final rendering has an effective composition and balance. At the abstraction level of design, the thread-and-halo effect was carefully constructed to represent directional information, while avoiding overwhelming the image, so that a direct-volume-rendered layer would not be obstructed. At the interactive level of design, effective composition and balance are achieved through manipulating the transfer function widgets 16A. Careful use of color, transparency and culling is important when preparing a view of the data that illustrates or locates a particular trend or anomaly. For example, a transfer function for a direct-volume-rendered layer that uses bright orange to indicate tumorous regions in the brain should preferably not be used in conjunction with a transfer function that uses bright orange in a thread layer to represent paths typically found around a tumor, as the two layers will be too difficult to visually distinguish. In general, transfer functions that operate well in representing a single variable do not necessarily operate without modification within a layered rendering approach. The visual design aspect of scientific visualization, with special emphasis on color and balanced composition, is particularly important within this framework.

The foregoing has described a volume-rendering approach for visualizing multivalued datasets. The preferred method has four major steps: calculating derived datasets, deriving at least one visual representation from the primary and derived datasets, mapping the derived visual representation(s) through interactive transfer functions, and exploring interactively. An important component of the method performed by the rendering engine 12 is the abstraction of the derived values into separate layers of visual representations. This enables the volume rendering engine 12 to provide the interactive manipulation, via the widgets 16A, of the visual attributes of each volume layer.

The use of thread and halo density volumes is one example of complementary volumes. Together, they provide an interactive visual representation of continuous directional information.

Labeling the thread volume according to some culling criterion, e.g., path length, allows the user to control culling interactively. By manipulating a transfer function the user can remove portions of a volume to expose interesting structures that might otherwise be occluded. The user can quickly generate many different images of multivalued datasets using this mechanism. Thus, the user can quickly explore large regions of a volumetric dataset and, through this exploration, arrive at a better overall understanding of complicated multivalued data.

Also disclosed has been a technique for rendering visibility-occluding halos within a volume in real time. The halos increase the depth perception of the thread path representations and help achieve the 3D understanding that is important when examining volumetric data.

It has been shown that by the use of this invention one may interactively render and manipulate multivalued volumetric datasets on the PC 15A equipped with a commodity graphics card 15B. In the preferred embodiment there is implemented a texture-based multi-pass volume renderer that composites the different layers together into a final image. To visualize and interactively manipulate the individual layers programmable texture blending is employed.

Additionally, it has been shown how two or more complementary visual representation layers, for example the direct-volume-rendered DTI and the thread paths, can be used to effectively explore multivalued volumetric datasets. The anatomical context provided by multiple layers enhances an understanding of the data for the viewer. Understanding is also enhanced through interaction, providing the manipulation widgets 16A for each of the layers makes possible exploration of the individual layers and, more importantly, of the relationships among the data values of the individual layers.

The presently preferred layered complementary volumes approach can be used to advantage for the visualization of diffusion characteristics of the human brain, where it is possible to simultaneously represent both planar and linear anisotropy, as well as smooth transitions between the two. An anatomical reference is also provided for the data, which is important in contextualizing the diffusion information.

For the exploration of blood flow in a bifurcated artery, the layered volumes approach is also successful in representing anatomical references. The thread paths and halos representation has been shown to be particularly useful in representing streamlines and vorticity lines. Correlating this layer of representation with a direct-volume-rendered layer aids in locating regions of vorticity change and other interesting flow features. As in the brain diffusion application, exploratory culling and the interactive manipulation widgets 16A are useful in quickly creating many different images of the data, leading to a better understanding of the 3D flow.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims.

As but some examples, the use of other similar or equivalent hardware components, graphics cards, data storage and compression formats, widget types for controlling underlying graphical functions, lighting calculations, techniques to enhance the visibility of the threads (such as the above-noted use of shading) and the like may be attempted by those skilled in the art. Further, those skilled in the art will realize that this invention has utility far beyond the two primary examples provided above, i.e., in rendering MRI-derived brain images, and measured or simulated blood vessel images, either arterial or venous. Also, this invention can be practiced using a stand-alone computer system, such as a PC, or it can be practiced in a networked embodiment with one or more computers coupled through a data communications network to one or more servers that implement all or some of the described functionality.

3D phase contrast MRI is one suitable technique for directly measuring flow, such as blood flow, as is particle image velocimetry. However, and as was discussed above, in other embodiments the flow primary data may be obtained from modeling and simulations, and not directly measured. The flow data (measured or computed) can be combined, if desired, with other primary data, such as data derived from the MRI system 14.

It is important to note that all such and similar modifications of the teachings of this invention will still fall within the scope of this invention. Further, while the method and apparatus described herein are provided with a certain degree of specificity, the present invention could be implemented with either greater or lesser specificity, depending on the needs of the user. Further, some of the features of the present invention could be used to advantage without the corresponding use of other features. As such, the foregoing description should be considered as merely illustrative of the principles of the present invention, and not in limitation thereof, as this invention is defined by the claims which follow.

What is claimed is:

1. A method, comprising:
   calculating additional data values from multivalued primary data;
   deriving at least one volume-based visual representation from the multivalued primary data and the calculated additional data values, the derived at least one volume-based visual representation comprising a layer representing a computed volume-based visual representation that elucidates the underlying data; and
   mapping the derived at least one volume-based visual representation through transfer functions to hardware primitives for volumetrically rendering the at least one volume-based visual representation;
   where the multivalued primary data comprises diffusion tensor data generated by a magnetic resonance imaging system from tissue, and where deriving comprises identifying directed diffusion paths and rendering the directed diffusion paths as thread-like structures that are made visually distinct from another and from other tissue by the use of a complementary volume disposed around the thread-like structures.

2. A method as in claim 1, further comprising interacting with the volumetrically rendered at least one volume-based visual representation.

3. A method as in claim 1, where the multivalued primary data comprises a multivalued combination obtained from T1 weighted data, T2 weighted data, diffusion data, velocity data, magnetization transfer data, perfusion data and simulation data.

4. A method, comprising:
   calculating additional data values from primary data;
   deriving at least one visual representation from the primary data and the additional data values; and
   mapping the derived visual representations through transfer functions to hardware primitives for volumetrically rendering the derived at least one visual representation,
   where the primary data comprises diffusion tensor data generated by a magnetic resonance imaging system from tissue, where calculating and deriving comprise identifying directed diffusion paths, and where mapping comprises visualizing the directed diffusion paths as thread-like structures.

5. A method as in claim 4, where the tissue comprises a blood vessel, and where at least flowing blood velocity and vorticity are visualized.

6. A method as in claim 4, where the tissue comprises brain tissue.

7. A method as in claim 4, further comprising rendering the thread-like structures so as to make them visually distinct from another and from other tissue by the use of a complementary volume disposed around individual ones of the thread-like structures.

8. A method as in claim 2, where interacting comprises using an exploratory culling volume to interactively control the complexity of a visualized layer.

9. A method as in claim 2, where interacting comprises using at least one of one-dimensional transfer function editing, two-dimensional transfer function editing, and two-dimensional barycentric transfer function editing.

10. A method as in claim 4, where a first lighting model is used to visualize volume layers containing the thread-like structures, and where a second lighting model is used to visualize other volume layers.

11. A method, comprising:
calculating additional data values from the primary data;
deriving at least one visual representation from the primary data and the additional data values;
mapping the derived visual representations through transfer functions to hardware primitives for volumetrically rendering the derived at least one visual representation; and
interacting with the visualization representation,
where the primary data comprises diffusion tensor data generated by a magnetic resonance imaging system from tissue, where calculating and deriving comprise identifying directed diffusion paths, where mapping comprises visualizing the directed diffusion paths as thread-like structures, and where interacting comprises varying a density volume of visualized thread-like structures by varying at least one of a thread-length criterion and a diffusion rate criterion.

12. A method as in claim 1, where calculating and deriving comprise identifying flow paths, and where mapping comprises visualizing flow streamlines and vorticity lines.

13. A method as in claim 1, where the multivalued primary data further comprises data generated by at least one of a computed tomography scanning system, a positron emission tomography system, a functional MRI, a multi-electrode EEG or MEG, a confocal microscope, a multi-photon microscope and an optical projection tomography system.

14. A method as in claim 1, where mapping comprises generating a plurality of superimposed visual layers from the primary and calculated additional data values, further comprising interactively modifying a displayed representation by varying at least one parameter in at least one of the layers.

15. A method as in claim 1, where mapping comprises generating an ordered sequence of view aligned slices, where the slices are arranged in order from back to front, and where each slice is rendered a plurality of times, once for each volume layer.

16. A method as in claim 15, where a direct-volume-rendered layer is rendered first, followed by other layers containing additional structure.

17. A system, comprising a rendering engine having an input coupled to a source of multivalued primary data and an output coupled to a display means, said rendering engine comprising a data processor configured to calculate additional data values from the primary data, said data processor further configured to derive at least one volume-based visual representation from the primary data and the additional data values, the derived at least one volume-based visual representation comprising a layer representing a computed volume-based visual representation that elucidates the underlying data, said data processor further configured to map the derived volume-based visual representation through transfer functions to hardware primitives for volumetrically rendering the derived at least one volume-based visual representation to provide a visualization, further comprising a user interface for interacting with the visualization, where the multivalued primary data comprises diffusion tensor data generated by a magnetic resonance imagine system from tissue, and where said data processor is further configured to identify directed diffusion paths and to render the directed diffusion paths as thread-like structures that are made visually distinct from another and from other tissue by the use of a complementary volume disposed around the thread-like structures.

18. A system as in claim 17, where the multivalued primary data comprises a multivalued combination obtained from T1 weighted data, T2 weighted data, diffusion data, velocity data, magnetization transfer data, perfusion data and simulation data.

19. A system to render volumetric multivalued primary data, comprising a rendering engine having an input coupled to a source of multivalued primary data and an output coupled to a display means, said rendering engine comprising a data processor configured to calculate additional data values from the primary data, to derive at least one visual representation from the primary data and the additional data values and to map the derived visual representation through transfer functions to hardware primitives for use in volumetrically rendering the derived visual representation to provide a visualization,
where the primary data comprises diffusion tensor data generated by a magnetic resonance imaging system from tissue, where said data processor is further configured to identify directed diffusion paths and render the directed diffusion paths as thread-like structures.

20. A system as in claim 19, where the tissue comprises a blood vessel, and where indications of at least flowing blood velocity and vorticity are rendered.

21. A system as in claim 19, where the tissue comprises brain tissue.

22. A system as in claim 19, where said rendering engine renders the thread-like structures so as to make them visually distinct from another and from other tissue by the use of a complementary volume disposed around individual ones of the thread-like structures.

23. A system as in claim 17, where said user interface employs a exploratory culling volume to interactively control the complexity of a visualized layer.

24. A system as in claim 17, where said user interface displays a plurality of widgets to a user for enabling the user to perform at least one of one-dimensional transfer function editing, two-dimensional transfer function editing, and two-dimensional barycentric transfer function editing of a rendered image.

25. A system as in claim 19, where said data processor uses a first lighting model to visualize volume layers containing the thread-like structures and a second lighting model to visualize other volume layers.

26. A system as in claim 19, further comprising a user interface that comprises means for varying a density volume of visualized thread-like structures by varying at least one of a thread-length criterion and a diffusion rate criterion.

27. A system as in claim 17, where said processor operates to identify flow paths and to render flow streamlines and vorticity lines.

28. A system as in claim 17, where the primary data further comprises data generated by at least one of a computed tomography scanning system, a positron emission tomography system, a functional MRI, a multi-electrode EEG or MEG, a confocal microscope, a multi-photon microscope and an optical projection tomography system.

29. A system as in claim 17, where said processor operates to generate a plurality of superimposed visual layers from the primary and calculated additional data values, and where said user interface operates with a user to interactively modify a displayed representation by varying at least one parameter in at least one of the layers.

30. A system as in claim 17, where said processor operates to generate an ordered sequence of view aligned slices, where the slices are arranged in order from back to front, and where each slice is rendered a plurality of times, once for each volume layer.

31. A system as in claim 30, where a direct-volume-rendered layer is rendered first, followed by other layers containing finer structure.

32. A system as in claim 17, where said system comprises a computer containing at least one graphics card comprising texture memory and means for providing three dimensional texture processing, texture compression, and programmable texture blending.

33. A computer program product embodied on or in a computer-readable medium, the computer program product comprising computer readable program code comprising:
   computer readable program code for calculating additional data values from multivalued primary data;
   computer readable program code for deriving at least one volume-based visual representation from the multivalued primary data and the additional data values;
   computer readable program code for mapping the derived at least one volume-based visual representation through transfer functions to hardware primitives for volumetrically rendering the derived at least one volume-based visual representation, the derived at least one volume-based visual representation comprising a layer representing a computed volume-based visual representation that elucidates the underlying data; and
   computer readable program code providing a user interface function for enabling a user to interact with the volumetrically rendered derived at least one volume-based visual representation;
   where the multivalued primary data comprises diffusion tensor data generated by a magnetic resonance imaging system from tissue, and where deriving comprises identifying directed diffusion paths and rendering the directed diffusion paths as thread-like structures that are made visually distinct from another and from other tissue by the use of a complementary volume disposed around the thread-like structures.

34. A computer program product as in claim 33, where the primary data comprises a multivalued combination obtained from T1 weighted data, T2 weighted data, diffusion data, velocity data, magnetization transfer data, perfusion data and simulation data.

35. A computer program embodied on or in a computer-readable medium, the computer program product comprising computer readable program code comprising:
   computer readable program code for calculating additional data values from the primary data;
   computer readable program code for deriving at least one visual representation from the primary data and the additional data values;
   computer readable program code for mapping the derived visual representation through transfer functions to hardware primitives for volumetrically rendering the derived visual representation; and
   computer readable program code providing a user interface function for enabling a user to interact with the volumetrically rendered derived visual representation,
   where the primary data comprises diffusion tensor data generated by a magnetic resonance imaging system from tissue, where said computer program code for calculating and deriving comprises code for identifying directed diffusion paths, and where said computer program code for mapping comprises code for rendering the directed diffusion paths as thread-like structures.

36. A computer program as in claim 35, where the tissue comprises a blood vessel, and where at least flowing blood velocity and vorticity are rendered.

37. A computer program as in claim 35, where the tissue comprises brain tissue.

38. A computer program as in claim 35, operating to render the thread-like structures so as to make them visually distinct from another and from other tissue by the use of a complementary volume disposed around individual ones of the thread-like structures.

39. A computer program product as in claim 33, where said user interface function is operable for enabling a user to employ an exploratory culling volume to interactively control the complexity of a visualized layer.

40. A computer program product as in claim 33, where said user interface function is operable for enabling a user to employ at least one of one-dimensional transfer function editing, two-dimensional transfer function editing, and two-dimensional barycentric transfer function editing.

41. A computer program as in claim 35, where a first lighting model is used to render volume layers containing the thread-like structures, and where a second lighting model is used to render other volume layers.

42. A computer program as in claim 35, where said user interface function is operable for enabling a user to vary a density volume of rendered thread-like structures by varying at least one of a thread-length criterion and a diffusion rate criterion.

43. A computer program product as in claim 33, where said computer program code for calculating and deriving comprises code for identifying flow paths, and where said computer program code for mapping comprises code for rendering flow streamlines and vorticity lines.

44. A computer program product as in claim 33, where the primary data further comprises data generated by at least one of a computed tomography scanning system, a positron emission tomography system, a functional MRI, a multi-electrode EEG or MEG, a confocal microscope, a multi-photon microscope and an optical projection tomography system.

45. A computer program product as in claim 33, where said computer program code for mapping comprises code for generating a plurality of superimposed visual layers from the primary and calculated additional data values, further comprising computer program code for interactively modifying a displayed representation by varying at least one parameter in at least one of the layers.

46. A computer program product as in claim 33, where said computer program code for mapping comprises code for generating an ordered sequence of view aligned slices, where the slices are arranged in order from back to front, and where each slice is rendered a plurality of times, once for each volume layer.

47. A computer program product as in claim 46, where a direct-volume-rendered layer is rendered first, followed by other layers containing finer structure.

48. A system, comprising an input configured to receive multivalued primary data and an output to provide data for a visual display, further comprising a processor disposed between the input and the output and configured to calculate additional data values from the multivalued primary data, the processor further configured to generate a volume-based representation of the primary data and the additional data values, where the volume-based visual representation comprises a layer representing a computed volume-based visual representation that elucidates the underlying data, the processor further configured to send the volume-based representation to the output to be volumetrically rendered for presentation by the visual display, the processor configured to operate with a user interface for enabling user interaction with the presentation, where the primary data comprises diffusion tensor data generated by a magnetic resonance imaging system from tissue, and where the processor is further configured to identify directed diffusion paths and to render the directed diffusion paths as thread-like structures that are made visually distinct from another and from other tissue by the use of a complementary volume disposed around the thread-like structures.

49. The system as in claim 48, where the processor uses a first lighting model to visualize volume layers containing the thread-like structures and a second lighting model to visualize other volume layers.

50. The system as in claim 48, the user interface enabling control over a density volume of visualized thread-like structures by varying at least one of a thread-length criterion and a diffusion rate criterion.

51. The system as in claim 48, where said user interface comprises a plurality of widgets for enabling the user to perform at least one of one-dimensional transfer function editing, two-dimensional transfer function editing, and two-dimensional barycentric transfer function editing of a rendered image.

52. The system as in claim 48, where the primary data further comprises data generated by at least one of a computed tomography scanning system, a positron emission tomography system, a functional MRI, a multi-electrode EEG or MEG, a confocal microscope, a multi-photon microscope and an optical projection tomography system.

53. The system as in claim 48, where the volume-based representation comprises at least one layer representing a mapping of the additional data values to a volume.

54. The system as in claim 48, where the multivalued primary data comprises flow data, and where said processor is configured at least to identify flow paths and to map identified flow paths to visualize at least one of streamlines and vorticity.

* * * * *